United States Patent
Grim, III et al.

(10) Patent No.: US 8,005,272 B2
(45) Date of Patent: Aug. 23, 2011

(54) DIGITAL LIFE RECORDER IMPLEMENTING ENHANCED FACIAL RECOGNITION SUBSYSTEM FOR ACQUIRING FACE GLOSSARY DATA

(75) Inventors: Clifton E. Grim, III, Seabrook, TX (US); Rex Edward Marzke, Houston, TX (US); Mark B. Stevens, Austin, TX (US); John David Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 12/347,182

(22) Filed: Dec. 31, 2008

(65) Prior Publication Data
US 2009/0174787 A1    Jul. 9, 2009

Related U.S. Application Data

(63) Continuation-in-part of application No. 11/968,772, filed on Jan. 3, 2008.

(51) Int. Cl.
*G06K 9/00* (2006.01)
(52) U.S. Cl. .......................... 382/118; 382/115
(58) Field of Classification Search .......... 382/115, 382/118
See application file for complete search history.

(56) References Cited

U.S. PATENT DOCUMENTS

| | | | |
|---|---|---|---|
| 6,301,370 B1 * | 10/2001 | Steffens et al. | 382/103 |
| 7,024,681 B1 | 4/2006 | Fransman et al. | |
| 7,454,019 B2 | 11/2008 | Williams | |
| 7,551,755 B1 * | 6/2009 | Steinberg et al. | 382/118 |
| 7,555,148 B1 * | 6/2009 | Steinberg et al. | 382/118 |
| 7,564,994 B1 * | 7/2009 | Steinberg et al. | 382/118 |
| 7,664,233 B1 | 2/2010 | Kirchmeier et al. | |
| 2002/0184196 A1 * | 12/2002 | Lehmeier et al. | 707/3 |
| 2002/0188453 A1 | 12/2002 | Hirschberg et al. | |
| 2003/0077074 A1 | 4/2003 | Okamoto et al. | |
| 2003/0163339 A1 | 8/2003 | Elliot | |
| 2004/0001142 A1 | 1/2004 | Kumhyr | |

(Continued)

FOREIGN PATENT DOCUMENTS
EP    1475967 A1    11/2004
(Continued)

OTHER PUBLICATIONS

Article entitled "Surveillance Video Face Recognition (SVFR)" by Frederick, dated Nov. 2007.*

(Continued)

*Primary Examiner* — Mahesh Dwivedi
(74) *Attorney, Agent, or Firm* — Yee & Associates, P.C.; John R. Pivnichny

(57) ABSTRACT

Identifying individual facial images that are broadcast to enable optimized indexing and storage of facial information. Frames of data including faces are continually captured from a stream of incoming data. The facial frame data is extracted and processed into individual facial images. The individual facial images may be compared to existing facial image data in a database or cache to determine the identity of a facial image. The individual facial images may also be compared to facial images and metadata describing the facial images that are broadcast from external recording subsystems. The individual facial images stored to the glossary may be indexed based on the metadata received in the broadcast from an external recording subsystem or by metadata received from the continuous face frame capture.

17 Claims, 32 Drawing Sheets

U.S. PATENT DOCUMENTS

| | | | |
|---|---|---|---|
| 2004/0024688 A1 | 2/2004 | Bi et al. | |
| 2004/0049571 A1 | 3/2004 | Johnson et al. | |
| 2004/0155981 A1 | 8/2004 | Ichifuji et al. | |
| 2004/0180683 A1 | 9/2004 | Dennis et al. | |
| 2004/0213437 A1 | 10/2004 | Howard et al. | |
| 2004/0246127 A1 | 12/2004 | Junqua | |
| 2005/0075097 A1 | 4/2005 | Lehikoinen et al. | |
| 2005/0105779 A1* | 5/2005 | Kamei | 382/118 |
| 2005/0154682 A1 | 7/2005 | Taylor | |
| 2005/0162279 A1 | 7/2005 | Marshall et al. | |
| 2005/0180567 A1 | 8/2005 | Williams | |
| 2005/0182701 A1 | 8/2005 | Cheston et al. | |
| 2005/0207622 A1* | 9/2005 | Haupt et al. | 382/118 |
| 2005/0216274 A1 | 9/2005 | Kim | |
| 2005/0250548 A1 | 11/2005 | White | |
| 2005/0257241 A1 | 11/2005 | Faulkner et al. | |
| 2005/0264412 A1 | 12/2005 | Levesque et al. | |
| 2005/0270178 A1 | 12/2005 | Ioli | |
| 2006/0020630 A1* | 1/2006 | Stager et al. | 707/104.1 |
| 2006/0072811 A1* | 4/2006 | Porter et al. | 382/159 |
| 2006/0089912 A1 | 4/2006 | Spagna et al. | |
| 2006/0098088 A1 | 5/2006 | Raghunath | |
| 2006/0156417 A1 | 7/2006 | Choi | |
| 2006/0200541 A1 | 9/2006 | Wikman et al. | |
| 2006/0222244 A1* | 10/2006 | Haupt et al. | 382/220 |
| 2006/0224846 A1 | 10/2006 | Amarendran et al. | |
| 2006/0227237 A1 | 10/2006 | Kienzle et al. | |
| 2007/0003113 A1* | 1/2007 | Goldberg | 382/118 |
| 2007/0036395 A1 | 2/2007 | Okun | |
| 2007/0049984 A1 | 3/2007 | Osypka | |
| 2007/0112852 A1 | 5/2007 | Sorvari et al. | |
| 2007/0118372 A1 | 5/2007 | Wise et al. | |
| 2007/0124272 A1 | 5/2007 | DeCastra et al. | |
| 2007/0150517 A1 | 6/2007 | Malone | |
| 2007/0228159 A1* | 10/2007 | Kashiwa et al. | 235/380 |
| 2007/0294273 A1 | 12/2007 | Bendeck et al. | |
| 2007/0296817 A1 | 12/2007 | Ebrahimi et al. | |
| 2008/0046352 A1 | 2/2008 | Jung et al. | |
| 2008/0046406 A1 | 2/2008 | Seide et al. | |
| 2008/0071561 A1 | 3/2008 | Holcombe et al. | |
| 2008/0130960 A1* | 6/2008 | Yagnik | 382/118 |
| 2008/0159601 A1* | 7/2008 | Alberth et al. | 382/118 |
| 2008/0253623 A1* | 10/2008 | Hauke | 382/118 |
| 2009/0030952 A1 | 1/2009 | Donahue et al. | |
| 2009/0049413 A1* | 2/2009 | Lehtovirta et al. | 715/855 |
| 2009/0109286 A1 | 4/2009 | Ennis | |

FOREIGN PATENT DOCUMENTS

| | | |
|---|---|---|
| JP | 2002297893 | 10/2002 |
| WO | WO99/49656 | 9/1999 |

OTHER PUBLICATIONS

U.S. Appl. No. 11/968,772, filed Jan. 3, 2008, Boomer et al.
U.S. Appl. No. 12/277,804, filed Nov. 25, 2008, Grim, III et al.
U.S. Appl. No. 12/130,549, filed May 30, 2008, Grim, III et al.
U.S. Appl. No. 12/277,873, filed Nov. 25, 2008, Grim, III et al.
U.S. Appl. No. 12/347,156, filed Dec. 31, 2008, Grim, III et al.
U.S. Appl. No. 12/347,182, filed Dec. 31, 2008, Grim, III et al.
Picard, Ken, "Tales from the Cryptographer—Security Guru Bruce Schneider Busts the Myths of Post-9/11 Safety Measures", Jun. 2006, pp. 1-3, Retrieved Sep. 14, 2007, <http://www.schneier.com/news-019.html>.
Ward, Mark, "Log Your Life via Your Phone", BBC News Online, Mar. 2004, pp. 1-3, Retrieved Sep. 14, 2007, <http://news.bbc.co.uk/2/hi/technology/3497596.stm>.
Seward, Liz, "Sensor rise Powers Life Recorders", BBC News Online, Aug. 2007, pp. 1-3, Retrieved Sep. 14, 2007, <http://news.bbc.co.uk/2/hi/technology/6968591.stm>.
Carter, William, "Personal Life Recorder", William Carter Weblog, Sep. 2004, pp. 1, Retrieved Sep. 14, 2007, <http://interactive.usc.edu/members/will/archives/002470.php>.
Fleming, Nic, "Computers 'Could Store Entire Live by 2026", Dec. 2006, pp. 1, Retrieved Jan. 2, 2008, <http://www.telegraph.co.uk/core/Content/displayPrintabe.jhtml;jsessionid=C3FA5I1NTKF...>.
Genuth, "Saving Your Life on a Hard Drive", Jun. 2006, pp. 1-6, Retrieved Jan. 2, 2008, <http://www.tfpt.info/articles.php?itemId=16/>.
"Welcome", Streav, pp. 1, Retrieved Jan. 2, 2008, <http://streav.sorceforge.net/>.
Vemuri, Sunil, "What Was I Thinking?", Electronic Publishing Group, pp. 1-6, Retrieved Jan. 2, 2008 <http://web.media.mit.edu/~vemuri/wwit/wwit-overview.html>.
Yasuhiko, Naito, "A Role of Advanced Image Data Logger Systems in Marine Animal Studies", Coast Marine Science, vol. 30, No. 2, Feb. 21, 2006, pp. 407-413, Japan, retrieved from the Internet: URL: http://repository.dl.itc.u-tokyo.ac.jp/dspace/bitstream/2261/5663/1/KJ00004354639.pdf.
"Youtube—Broadcast Yourself" Internet Citation, XP002441767, retrieved from the Internet: URL: http://web.archive.org/web/20051001143606/http://ww.youtube.com.
Ting, J. S. L, et al, "A Dynamic RFID-Based Mobile Monitoring System in Animal Care Management Over a Wireless Network", Wireless Communications, Networking and Mobile Computing, 2007, WICOM 2007, International Conference on, IEEE, Piscataway, NJ, USA, Sep. 21, 2007, pp. 2085-2088.
Healey, Jennifer et al, "Startle Cam: A Cybernetic Wearable Camera", Wearable Computers, 1998. Digest of Papers, Second International Symposium in Pittsburgh, PA, USA, Oct. 19-20, 1998, Los Alamitos, CA, USA, IEEE Comput. Soc, US, Oct. 19, 1998, pp. 42-49.
Hartnell-Young et al., Article entitled "Lifeblog: A new Concept in Mobile Learning", dated 2005, Nov. 2005.
USPTO office action for U.S. Appl. No. 11/768,772 dated Mar. 17, 2010.
USPTO office action for U.S. Appl. No. 12/277,804 dated Jun. 1, 2010.
USPTO office action for U.S. Appl. No. 12/347,156 dated Jun. 21, 2010.
USPTO Final Office Action for U.S. Appl. No. 12/347,156 dated Oct. 14, 2010.
USPTO Notice of Allowance for U.S. Appl. No. 12/277,804 dated Oct. 15, 2010.
USPTO Office Action for U.S. Appl. No. 11/968,772 dated Nov. 23, 2010.
USPTO office action for U.S. Appl. No. 12/347,156 dated Jan. 31, 2011.
USPTO Notice of allowance for U.S. Appl. No. 11/968,772 dated Apr. 19, 2011.

* cited by examiner

DIGITAL LIFE RECORDER IMPLEMENTING ENHANCED FACIAL RECOGNITION SUBSYSTEM FOR ACQUIRING FACE GLOSSARY DATA

CROSS-REFERENCE TO RELATED APPLICATIONS

This application is a continuation-in-part of application Ser. No. 11/968,772, entitled "Method and Apparatus for Digital Life Recording and Playback", filed Jan. 3, 2008, and is related to patent application Ser. No. 12/277,804, entitled "Digital Life Recorder Implementing Enhanced Facial Recognition Subsystem for Acquiring a Face Glossary Data", filed Nov. 25, 2008, incorporated by reference herein for all purposes.

BACKGROUND

1. Field of the Invention

The disclosure relates generally to digital image processing and more specifically to the recording, identification, and processing of facial image data and metadata. Still more particularly, the present disclosure relates to a computer implemented method, apparatus, and computer program product for acquiring face glossary data for use by an enhanced facial recognition subsystem of a digital life recorder.

2. Description of the Related Art

Advancements in technology have drastically changed the way people do things. Gone are the days of printed encyclopedias. These paper-based resources have been replaced by a plethora of information readily available on the World Wide Web. Instead of taking a roll of film to a photo shop to be developed, digital images are stored on computers, laptops, and in digital photo frames. Additionally, because snapping a digital photograph or taking a digital video costs virtually nothing, more digital photos and videos are taken than was previously taken by conventional means. The digital images represent memories of special or even obscure events. However, searching for a particular digital image from the collection of digital images stored on a computer is a difficult task. In addition, numerous events in our daily lives are never captured on film. Furthermore, photos do not capture the spoken words, feelings, or environmental factors associated with everyday activities.

Accordingly, there exists a need for a mechanism for dynamically capturing, storing, and presenting data associated with all aspects of daily activities in an efficient manner.

BRIEF SUMMARY

The illustrative embodiments described herein provide a computer implemented method and apparatus for managing data. In one embodiment, the process identifies a source of the face glossary data in response to detecting an acquisition condition, wherein the source comprises at least one of a raw data queue, a first glossary from a peer digital life recorder system, and a second glossary from a remote repository. The process then retrieves the face glossary data from the source. Thereafter, the process stores the face glossary data from the source into the face glossary repository, wherein the face glossary repository comprises a face glossary cache and a face glossary database.

DETAILED DESCRIPTION

Figure 1:
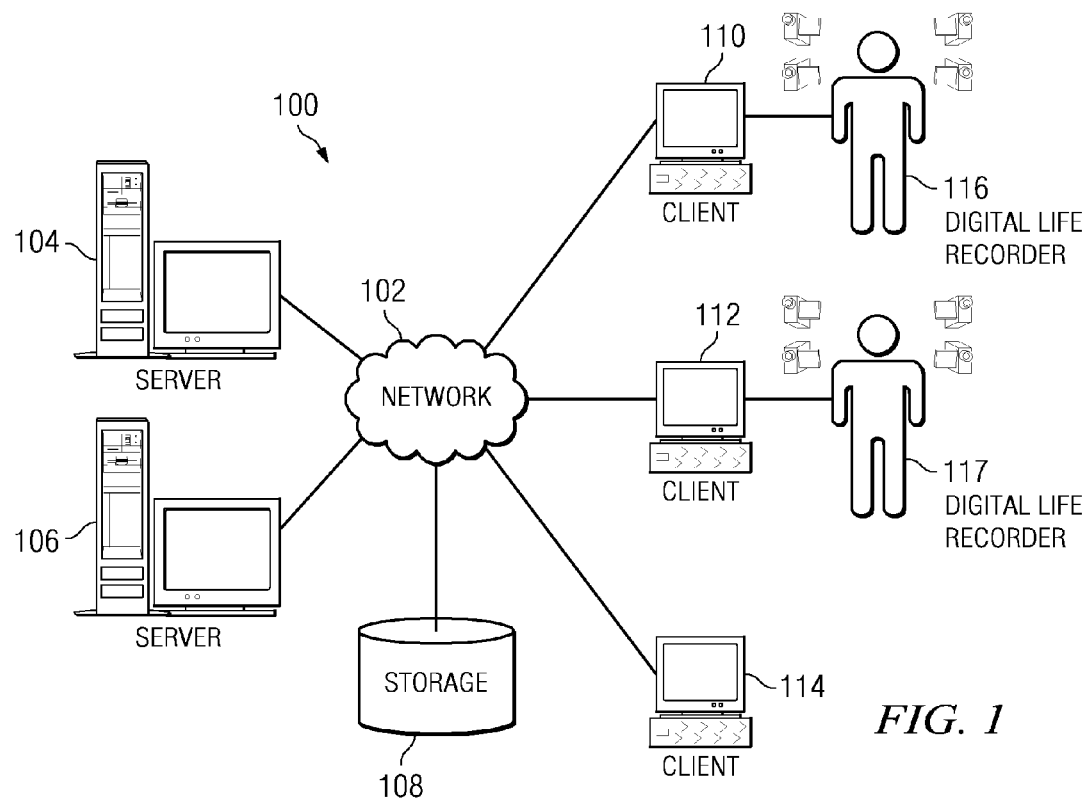
FIG. 1 is a pictorial representation of a network of data processing systems in which illustrative embodiments may be implemented.

As will be appreciated by one skilled in the art, the present disclosure provides a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
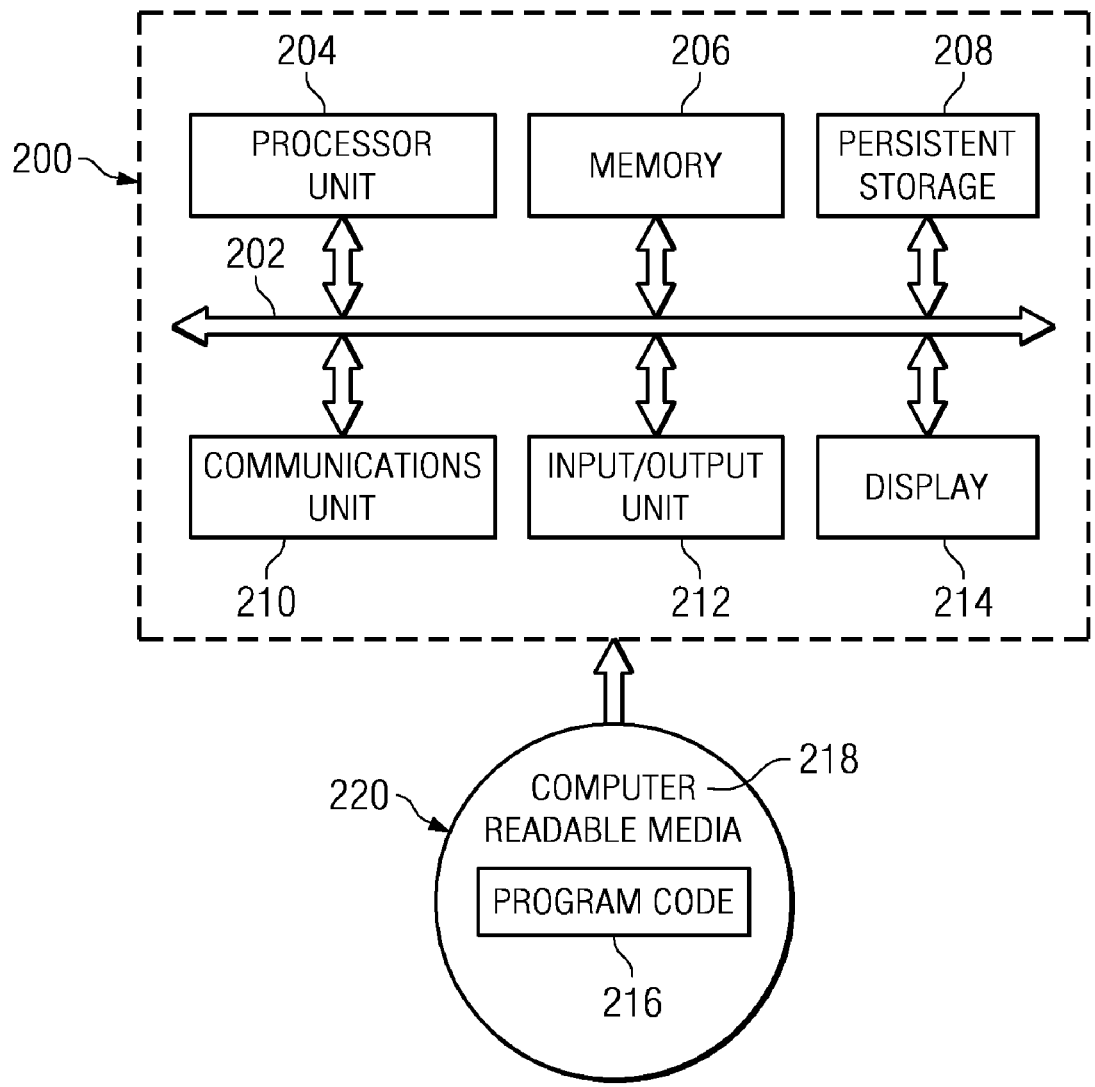
FIG. 2 is a block diagram of a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

The illustrative embodiments may be used as a digital life recorder for capturing still images, video, audio, biometric information, and other types of data associated with the daily activities of a person. The activities may be recorded on a continuous basis or may be periodically captured. For example, FIG. 1 depicts digital life recorder 116. Digital life recorder 116 captures data using one or more data capture devices. The data capture devices include, but are not limited to, video cameras and microphones. The captured data is processed by a mobile device associated with the person and is stored as raw data within a cache of the mobile device. Upon interfacing with a repository mass store, such as client 110, the stored data within the cache of the mobile device is uploaded to the repository mass store. Client 110 manages the data within the repository mass store and presents the data in response to a user request. Additional details of digital life recorder 116 and the repository mass store will be described below.

Data processing system 100 may also include additional digital life recording systems, such as digital life recorder 117. From the perspective of digital life recorder 116, digital life recorder 117 is a peer digital life recording system. A peer digital life recording system is a digital life recording system in a presence of another digital life recording system.

The components of network data processing system 100 may be configured for acquisition of face glossary data by a user of a digital life recorder, such as digital life recorder 116. Digital life recorder 116 may be updated by retrieving face glossary data from sources of face glossary data. The sources may include, for example, a peer digital life recorder. Digital life recorder 117 is a peer digital life recorder to digital life recorder 116. Other mobile devices like phones or video cameras may also be sources of face glossary data as well providing they have a collection of identified faces and some manner of connectivity. In addition, a remote repository may be hosted on a server, such as server 104. The remote repository may also store face glossary data. Furthermore, a user of a digital life recorder may use vocal commands to generate face glossary data from a set of frames located on a raw data queue of the digital life recorder. The raw data queue may be included in digital life recorder 116 or in a client computer in communication with digital life recorder 116.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. Data processing system 200 may also be implemented as a computing device on-board an electric vehicle, such as electric vehicle 116 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of processors. As used herein, the term "set" may refer to one or more. Thus, a set of processors may be one or more processors. In addition, processor unit 204 may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer-recordable storage media. In some instances, computer-recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The illustrative embodiments described herein provide a computer implemented method, apparatus, and computer program product for managing data. In one embodiment, the process identifies a source of the face glossary data in response to detecting an acquisition condition, wherein the source comprises at least one of a raw data queue, a first glossary from a peer digital life recorder system, and a second glossary from a remote repository. As used herein the phrase "at least one of" when used with a list of items means that different combinations one or more of the items may be used and only one of each item in the list may be needed. For example, "at least one of item A, item B, and item C" may include, for example, without limitation, item A or item A and item B. This example also may include item A, item B, and item C or item B and item C. In other words, the source of face glossary data may be either a raw data queue, a first glossary from a peer digital life recorder system, a second glossary from a remote repository, or any combination thereof.

The process then retrieves the face glossary data from the source. Thereafter, the process stores the face glossary data from the source into the face glossary repository. The face glossary repository may include the elements of a face glossary cache and a face glossary database. The face glossary data may be stored in the face glossary database. In some embodiments, the face glossary repository may include only one element. For example, the face glossary repository may include the face glossary cache or the face glossary database.

Figure 3:
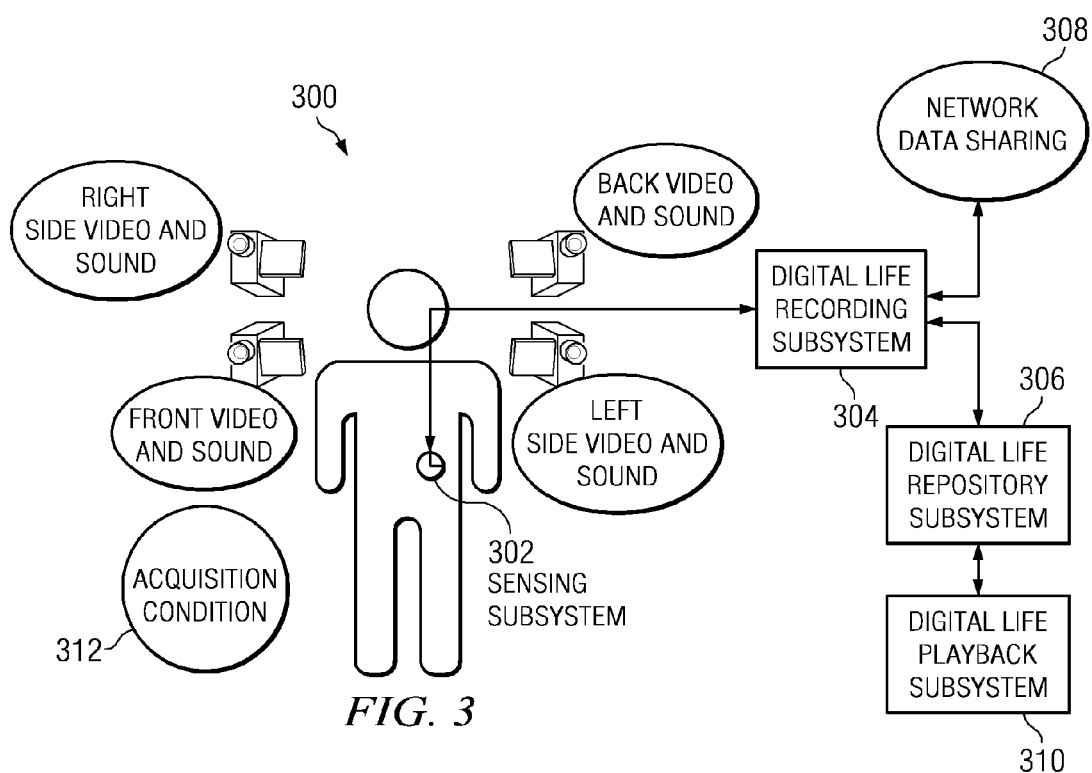
FIG. 3 is a diagram of components of a digital life recorder in accordance with an illustrative embodiment.

With reference now to FIG. 3, a diagram of components for a digital life recorder is depicted in accordance with an illustrative embodiment. In this example, digital life recorder 300 comprises of a sensing subsystem 302, a digital life recording subsystem 304, digital life repository subsystem 306, network data sharing 308, and digital life playback subsystem 310. Sensing subsystem 302 and digital life recording subsystem 304 may be implemented in a recording subsystem, such as digital life recorder 116 as shown in FIG. 1. Digital life repository subsystem 306, network data sharing 308, and digital life playback subsystem 310 may be implemented in a data processing system, such as data processing system 200 as shown in FIG. 2 and client 110 as shown in FIG. 1.

Sensing subsystem 302 comprises of data capturing devices for capturing data. The data capturing devices may comprise, for example, without limitation video capturing devices, audio capturing devices, biometric capturing devices, global positioning devices, environmental sensor devices, and other suitable devices for digital life recording. The data captured by the devices of subsystem 302 is referred to as digital life recording data.

As depicted in FIG. 3, the video capturing devices may be positioned on the person to capture a 360-degree field of view around the person. Additionally, a set of audio capturing devices may be positioned around the person. A set of biometric sensors captures physiological data associated with the person, such as, but not limited to, the heart rate of the person. A set, as referenced herein, may be comprised of one or more objects. Global positioning system devices coupled to the person captures the location and the precise time that data is captured. A set of environmental sensor devices captures environmental variables, such as, but not limited to, temperature, wind speed, barometric pressure, and humidity. In addition, the set of environmental sensor devices may detect environmental hazards, such as, but not limited to, detecting the electric field, radiation, and carbon monoxide. Other data capturing devices that may associated with the person may include, but are not limited to, medical devices, cellular telephones, and radio-frequency identification devices.

The data capturing devices captures data that may be hidden in common apparel, such as glasses, a hat, clothing, or jewelry. In another illustrative embodiment, some or all of the capturing devices may be medically implanted into the person's body.

Sensing subsystem 302 may also include a computer for processing the data captured by the devices into a raw data queue. Further details of sensing subsystem 302 are described in FIG. 4 below.

Sensing subsystem 302 transmits the raw data captured by the data capturing devices to digital life recording subsystem 304. Digital life recording subsystem 304 processes the raw data into a processed data queue and stores the data from the processed data queue into a daily cache of a mobile device associated with the person. The details of digital life recording subsystem 304 will be described in FIG. 5.

Digital life repository subsystem 306 manages the long-term storage and cataloging of the information representing the person's "digital life" that accumulates over time. On a periodic basis, digital life repository subsystem 306 interfaces with digital life recording subsystem 304 and uploads data stored in the cache of the mobile device. Additionally, details of digital life repository subsystem 306 will be described in FIG. 7.

Network data sharing 308 may also be a component of digital life recorder 300. Network data sharing 308 provides functions, such as aggregating, organizing, formats, and attaching metadata to data acquired via public, inter-personal, and intra-personal data sharing networks. The resultant aggregate is fed into digital life recording subsystem 304 in these examples. Network data sharing 308 is further described in FIG. 9 below.

Digital life playback subsystem 310 may be responsible for the user interface that organizes and presents the information, stored in the digital life repository subsystem 306, to a user for review and further processing. Additional details of digital life playback subsystem 310 will be described in FIG. 10.

Components of digital life recorder 300 may be configured to detect acquisition condition 312. Acquisition condition 312 is an event or condition that causes digital life recorder 300 to seek out and acquire additional face glossary data for updating the face glossary data of a digital life recording system. Face glossary data is data that may be used for identifying faces in images. Face glossary data may include metadata describing the features of a face and a name or other identifier for assigning an identity to the metadata. The additional face glossary data may be acquired from a source of face glossary data. Sources of face glossary data may include, without limitation, a face glossary database of a peer digital life recorder system, a remote repository, or a raw data queue having image data therein.

Examples of acquisition condition 312 may include, for example, a presence of a peer digital life recording system. A peer digital life recorder system is second digital life recording system in the presence of a first digital life recording system. For example, digital life recorder 117 is a peer digital life recording system to digital life recorder 116 in FIG. 1. In one embodiment, the peer digital life recording system may be detected by components of subsystem of network data sharing 308. Acquisition condition 312 may also be the detection of updated records of a remote repository. The updating of records in the remote repository may be detected by components of digital life repository subsystem 306. In addition, acquisition condition 312 may be an expiration of a pre-defined period of time. For example, components of digital life repository subsystem 306 may automatically seek out new or updated face glossary data from a remote repository every hour.

Figure 4:
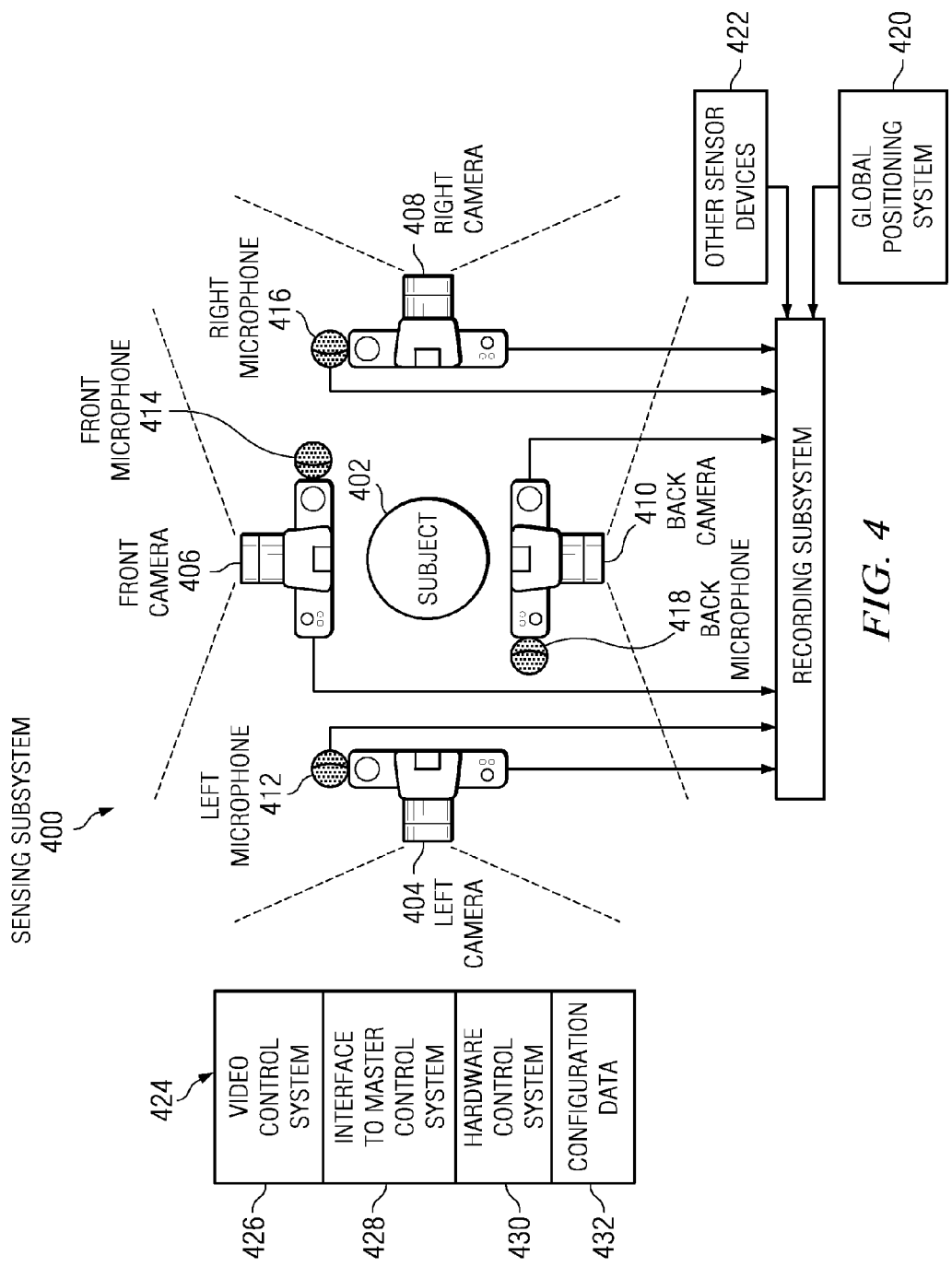
FIG. 4 is a diagram of components of a sensing subsystem in accordance with an illustrative embodiment.

With reference now to FIG. 4, a diagram of components in a sensing subsystem is depicted in accordance with an illustrative embodiment. Sensing subsystem 400 comprises of a plurality of data capturing devices associated with a person 402.

In this illustrative example, the data capturing devices comprises of a left camera 404, a front camera 406, a right camera 408, and a back camera 410. Additionally, a left microphone 412, a front microphone 414, a right microphone 416, and back microphone 418 are used for capturing audio data. A global positioning system 420 and other sensor devices 422 may also be associated with person 402. Other sensor devices 422 may include, but are not limited to, a set of biometric devices and a set of environmental sensor devices.

Data model 424 depicts the software components associated with managing sensing subsystem 400. Data model 424 comprises of a video control system 426, an interface to master control system 428, a hardware control system 430, and configuration data 432. The data captured by the data capturing devices is transmitted to a recording subsystem, as will be described below in FIG. 5.

Figure 5:
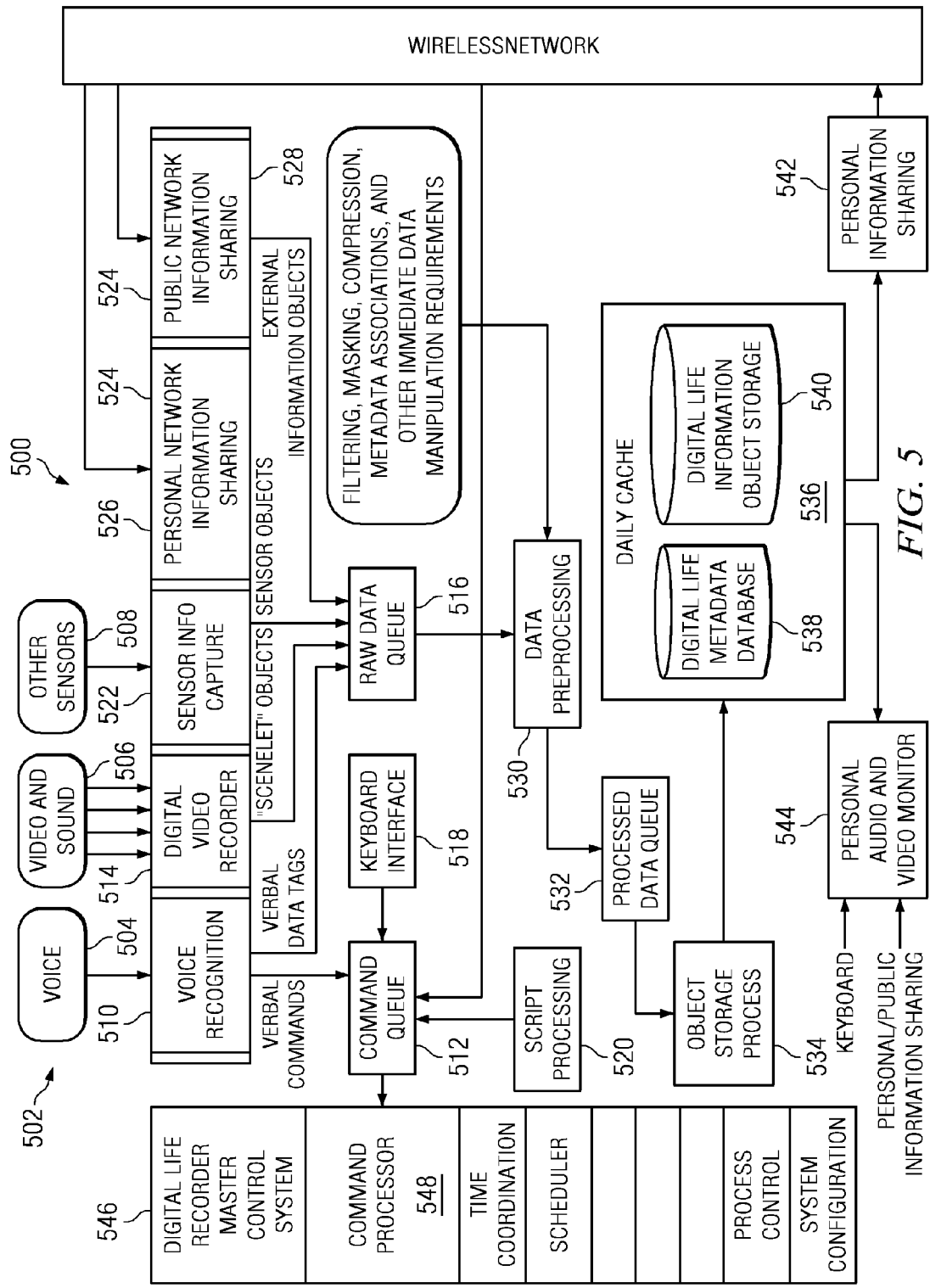
FIG. 5 is a block diagram showing the relationship between components of a sensing subsystem and the components of a recording subsystem in accordance with an illustrative embodiment.

FIG. 5 is a block diagram illustrating the data flow between components of a sensing subsystem and the components of a recording subsystem 500 in accordance with an illustrative embodiment. The components of recording subsystem 500 may be implemented in a data processing system, such as data processing system 200 as shown in FIG. 2.

Recording subsystem 500 processes inputs and commands from all the different sources and stores the data in a daily cache. In this illustrative example, recording subsystem 500 comprises of a voice recognition component 510, a command queue 512, a digital video recorder 514, a raw data queue 516, a keyboard interface 518, a script processing 520, a sensor information capture 522, a data preprocessing component 530, a processed data queue 532, an object storage process 534, and a daily cache 536.

Recording subsystem 500 receives input from sensing subsystem 502. Sensing subsystem 502 depicts inputs received from data capturing devices in accordance with an illustrative embodiment of a sensing subsystem, such as sensing subsystem 302 in FIG. 3. Sensing subsystem 502 is responsible for capturing video and sound, voice commands, time and location, environmental details like temperature, biometric information, and any other information that can be imagined to be useful and for which sensors exist. In this example, inputs captured by sensing subsystem 502 includes voice input 504, video and sound input 506, and input from other sensors 508.

Digital life recorder master control system 546 directs the control of sensing subsystem 502. Master control system 546 passes the captured data on to recording subsystem 500 for further processing.

Recording subsystem 500 sends data received from voice input 504 to voice recognition component 510. Voice recognition component 510 processes the data received from voice input 504 to interpret voice commands. The voice commands are forwarded to command queue 512. Command queue 512 may also receive other types of input, such as, but not limited to, input from a cellular phone (not depicted), keyboard interface 518, or inputs received from script processing 520. A script is a set of commands written in an interpreted language to automate certain application tasks. Command queue 512 sends commands to master control system 546. These commands are executed by a command processor 548. The commands can be used to get feedback through headphones and/or display and allows the user to control and configure the system in near real-time.

Recording subsystem 500 passes data from video and sound input 506 to digital video recorder 514. Digital video recorder 514 converts analog data to digital data and organizes the data into data segments. Digital video recorder 514 also takes in metadata from the data capturing devices. Metadata is data that describes the content, quality, condition, origin, and other characteristics of data. The metadata includes a timestamp and location captured by a global positioning system device, such as global positioning system 418 shown in FIG. 4.

The data segments are tagged with the timestamp and location of when and where each data segment was captured prior to sending the data segments to raw data queue 516. In addition, data is captured from other sensors 508 and processed by sensor information capture 522 prior to relaying the data to raw data queue 516.

Additionally, raw data queue 516 may include external information data gathered from a network data sharing component 524. Network data sharing component 524 aggregates, organizes, formats, and attaches metadata to data acquired via public, inter-personal, and intra-personal data sharing networks. Network data sharing component 524 includes a personal network information sharing component 526 and a public network information sharing component 528. Network data sharing component 524 is described in more detail in FIG. 8 below.

Data preprocessing component 530 filters, masks, compresses, applies metadata associations, and processes other immediate data manipulation functions. Data preprocessing component 530 reads information from raw data queue 516 and passes the pre-processed data along to processed data queue 532. Recording subsystem 500 uses processed data queue 532 to temporarily store the data before passing the data along to the object storage process 534. Object storage process 534 places the data into daily cache 536. The data is placed into two separate databases within daily cache 536; digital life metadata database 538 and digital life information object database 540. Daily cache 536 has enough storage capacity to hold the captured data until recording subsystem 500 interfaces with a repository mass store.

Figure 8:
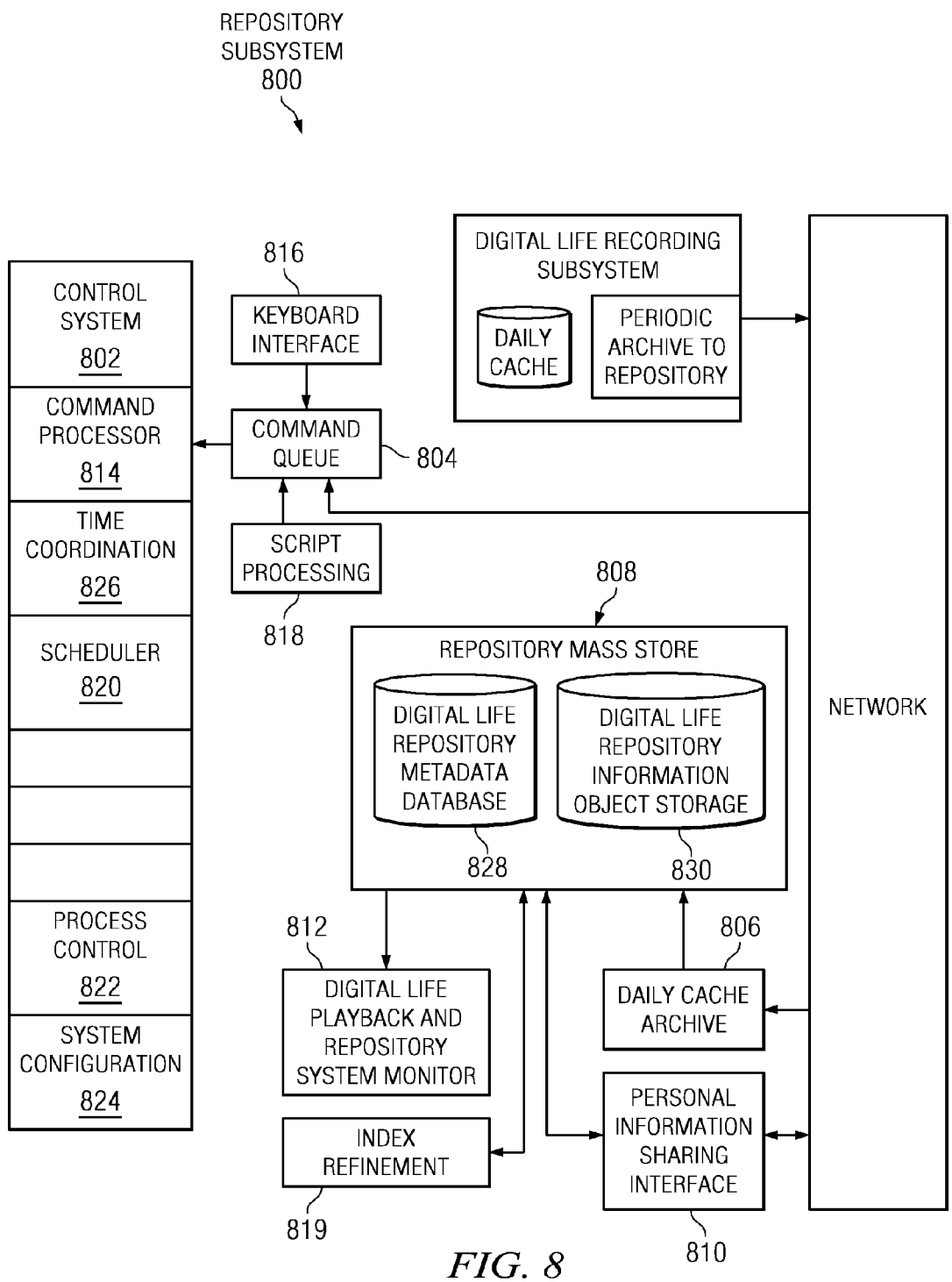
FIG. 8 is a block diagram showing the relationship between components of a repository subsystem in accordance with an illustrative embodiment.

Recording subsystem 500 uses a personal information sharing subsystem 542, as will be further described in FIG. 8, to broadcast information from digital life metadata database 538 and digital life information object database 540, within daily cache 536, to authorized users via a wireless or Bluetooth network. Recording subsystem 500 also uses a personal audio and video monitor subsystem 544 to provide a user interface to the data in daily cache 536. Recording subsystem 500 provides a keyboard, which can be used to enter commands and access the user interface functions. Recording subsystem 500 also provides a method to describe and connect to network data sharing component 524.

Figure 6:
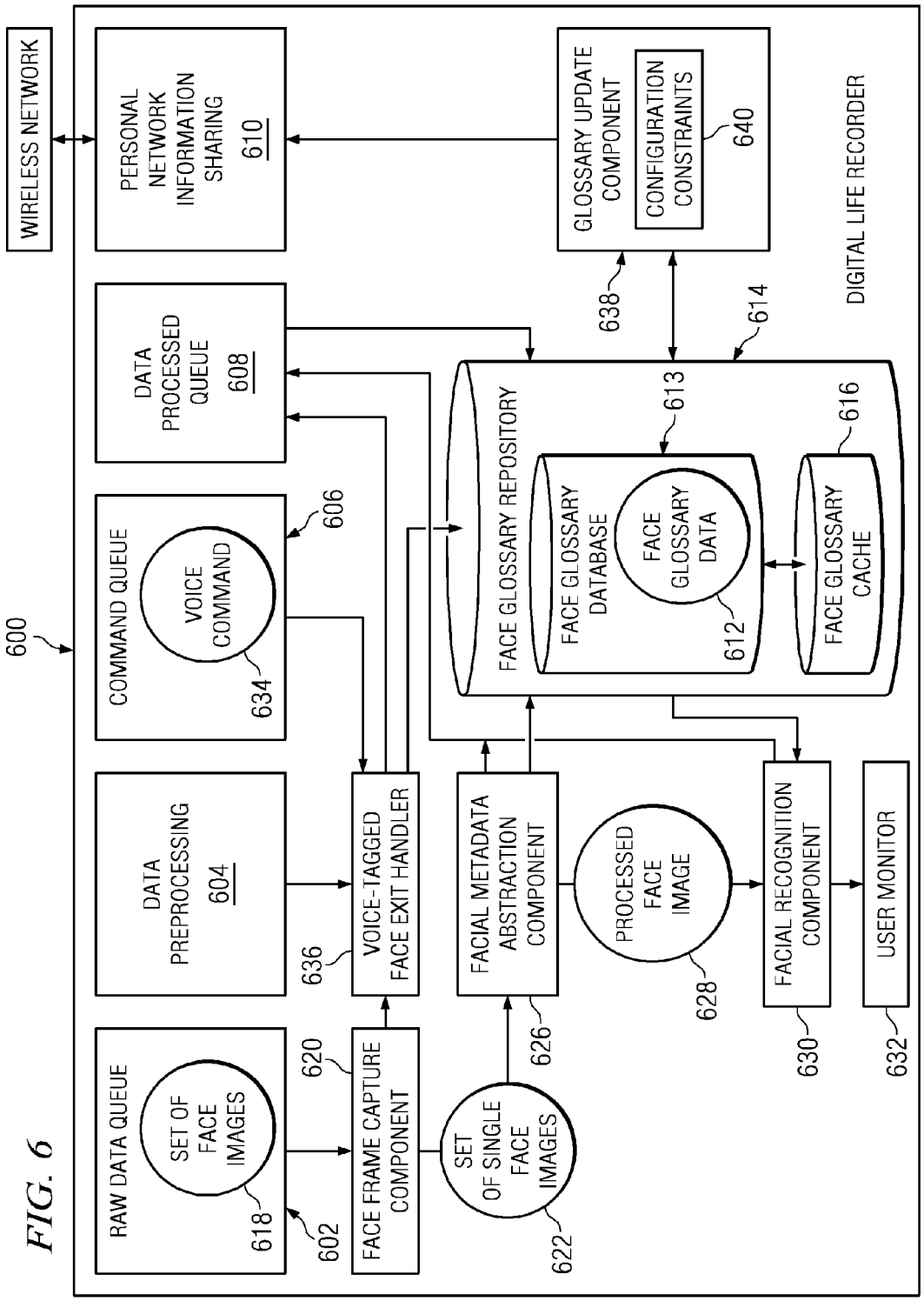
FIG. 6 is a block diagram of a digital life recorder configured for acquiring face glossary data in accordance with an illustrative embodiment.

FIG. 6 is a block diagram of a digital life recorder configured for acquiring new or updated face glossary data in accordance with an illustrative embodiment. Digital life recorder 600 is a digital life recorder such as digital life recorder 300 in FIG. 3.

Digital life recorder 600 includes raw data queue 602, data preprocessing 604, command queue 606, data processed queue 608, and personal network information sharing 610. Raw data queue 602 is a raw data queue, such as raw data queue 516 in FIG. 5. Data preprocessing 604 is a data preprocessing component, such as data preprocessing 530 in FIG. 5. Command queue 606 is a command queue, such as command queue 512 in FIG. 5. Data processed queue 608 is a data processed queue, such as processed data queue 532 in FIG. 5. Personal network information sharing 610 is a personal network information sharing component, such as personal network information sharing 524 in FIG. 5.

Digital life recorder 600 acquires face glossary data 612 in response to detecting an acquisition condition, such as acquisition condition 312 in FIG. 3. Face glossary data 612 is data generated from images of faces. Face glossary data 612 includes metadata describing features of the face. Face glossary data 612 may also include a name or other form of identifier associated with the metadata for identifying faces of face glossary data 612. Face glossary data 612 may be used for identifying subjects in subsequently captured images displaying faces. In addition, face glossary data 612 may be used for searching a repository of images for locating images in which selected subjects are present.

Face glossary data 612 may be stored in face glossary database 613 and optionally in face glossary cache 616. Face glossary database 613 is an application maintaining a structured collection of face glossary data. Face glossary data 612 may also be stored in face glossary cache 616. Face glossary cache 616 is a cache of face glossary data that is most commonly used, or most recently used. Face glossary data may be stored in face glossary cache 616 for reducing an amount of time required for subsequently accessing face glossary data.

A digital life recorder may implement more than one facial glossary database and more than one facial glossary cache. For example, face glossary database 613 and face glossary cache 616 may be included in a sensing subsystem carried around by a user of digital life recorder 600. The sensing subsystem may be a sensing subsystem, such as sensing subsystem 302 in FIG. 3. In addition, the digital life recorder may include a second face glossary database and a second face glossary cache included in a repository subsystem, such as repository subsystem 800 in FIG. 9. The repository subsystem may be located remotely from the sensing subsystem carried about by the user. For example, the repository subsystem may be stored on a server or client computer, such as server 104 and client 110 in FIG. 1.

Digital life recorder 600 acquires additional face glossary data in response to detecting an acquisition condition, such as acquisition condition 312 in FIG. 3. The additional face glossary data may be new face glossary data, or updated face glossary data. In either event, the additional face glossary data increases the likelihood that digital life recorder 600 will correctly identify a subject encountered by the user of digital life recorder 600. The source from which the additional face glossary data may be acquired includes raw data queue 602, a face glossary database from a peer digital life recorder, and a remote repository. The peer digital life recorder is a second digital life recorder in proximity to digital life recorder 600. The remote repository is a remote repository, such as remote repository 814 in FIG. 9.

Raw data queue 602 may be a source of face glossary data for updating face glossary database 613. Raw data queue 602 includes set of face images 618 from which face glossary data may be derived. Set of face images 618 is one or more images in which faces are present. The images may be digital photos or video frames that are captured by components of a digital life recorder, such as a recording subsystem. In addition, the digital photos or video frames may be acquired from remote sources, such as a social networking website or a personal camera.

Face frame capture component 620 is a software component of digital life recorder 600 that detects the presence of set of face images 618 in raw data queue 602 and initiates the process of generating face glossary data 612 from set of face images 618. Face frame capture component 620 monitors raw data queue 602 to detect set of face images 618. In response to detecting the presence of set of face images 618, face frame capture component 620 processes set of face images 618 to form set of single face images 622. Set of single face images 622 is one or more images displaying an image of a single face. Set of single face images 622 may be generated from a video frame or digital photo displaying more than one face. For example, if a user of digital life recorder 600 is present at dinner, a camera of a sensing subsystem of the digital life recorder system may capture a video frame of two family members at a dinner table. Face frame capture component 620 identifies the video frame depicting the two family members as set of face images 618. Thereafter, face frame capture component 620 generates two images from the video frame to form set of single face images 622. Each of the images of set of single face images 622 is of one family member, cropped to show only a single face image.

Face frame capture component 620 sends set of single face images 622 to facial metadata abstraction component 626 for further processing. Facial metadata abstraction component 626 is a software component of digital life recorder 600 that performs a metadata abstraction process on each image of set of single face images 622. Facial metadata abstraction is a process of generating metadata describing the features of a face image. The metadata may be used for identifying the faces in set of single face images 622. In addition, the metadata may be subsequently used for identifying a person encountered by a user operating digital life recorder 600.

The processing of set of single face images 622 by facial metadata abstraction component 626 forms processed face image 628. Processed face image 628 is a set of one or more single face images, including metadata, describing the single face image. Facial metadata abstraction component 626 sends processed face image 628 to facial recognition component 630. Facial recognition component 630 is a software component that identifies the subjects in processed face image 628. Facial recognition component 630 identifies the subject in processed face image 628 by comparing the facial metadata describing the features of the subjects in processed face image 628 with face glossary data 612. In an illustrative embodiment, facial recognition component 630 compares processed face image 628 with face glossary data stored in face glossary cache 616 first. If facial recognition component 630 is unable to locate facial glossary data from face glossary cache 616 that matches processed face image 628, then facial recognition component 630 compares processed face image 628 with face glossary data stored in face glossary database 613.

Facial recognition component 630 may present results of the identification to a user on user monitor 632. User monitor 632 is a user interface, such as personal audio and video monitor 544 in FIG. 5. For example, if facial recognition component 630 is able to match processed face image 628 with existing face glossary data, then a user may be prompted to confirm the identity of the identified subject(s). The confirmation may be provided at user monitor 632. Alternatively, if facial recognition component 630 is unable to locate face glossary data that matches processed face image 628, then facial recognition component 630 may request the user to identify the subject in processed face image 628. In one embodiment, the user may identify the subject by typing in a name of the subject presented on user monitor 632.

In another embodiment, facial recognition component 630 may perform exception processing for addressing anomalies resulting from the comparison of processed face image 628 with face glossary data 612. For example, if facial recognition component identifies a processed face image having two different identities, then facial recognition component 630 attempts to reconcile this discrepancy via exception processing. Facial recognition component 630 may discard inconsistent processed face images, or may prompt a user for remedial actions. In another embodiment, the inconsistent processed face images are processed but marked for subsequent review by a user or administrator.

The identification of subjects in processed face image 628 forms face glossary data, such as face glossary data 612. Once subjects of processed face image 628 are identified, either by user identification or by matching the subject in processed face image 628 with face glossary data 612, then processed face image 628 are sent to data processed queue 608 for storage into face glossary database 613 as face glossary data 612.

In addition to detecting the presence of set of face images 618, the process of generating face glossary data 612 from data queued in raw data queue 602 may be initiated by detecting voice command 634. Voice command 634 is a user-generated vocal instruction that triggers face frame capture component 620 to seek out one or more selected images of a face stored in raw data queue 602. Voice command 634 includes information for identifying the one or more images of a face that forms set of face images 618. For example, voice command 634 may include a timestamp identifying the one or more images that form set of face images 618.

Voice-tagged face exit handler 636 detects voice command 634 in command queue 606. In response to detecting voice command 634, voice-tagged face exit handler 636 provides face frame capture component 620 the information necessary for retrieving set of face images 618. For example, the information for retrieving set of face images 618 may be a date and time that set of face images 618 was captured. In addition, the information may include a unique identifier, such as an address in memory, assigned to set of face images 618 for locating set of face images 618.

Voice command 634 is placed in command queue 606 by a voice recognition component, such as voice recognition 510 in FIG. 5. The voice recognition component generates voice command 634 in response to detecting a user-generated instruction.

Digital life recorder 600 also includes glossary update component 638. Glossary update component 638 is a software component for downloading face glossary data from a peer digital life recorder. In response to receiving a notification that digital life recorder 600 is in the presence of a peer digital life recorder, glossary update component 638 may initiate a data transfer of face glossary data from the peer digital life recorder. Glossary update component 638 may receive the notification indicating the presence of the peer digital life recorder from a sensor, such as other sensors 508 in FIG. 5.

Glossary update component 638 retrieves face glossary data 612 from the peer digital life recorder with reference to configuration constraints 640. Configuration constraints 640 is a set of rules that govern the transfer of face glossary data by glossary update component 638. For example, configuration constraints 640 may specify whether digital life recorder 600 may download face glossary data 612 stored in a face glossary database 613. The face glossary database 613 may be located in face glossary repository 614 of the peer digital life recorder. The configuration constraints 640 may also specify whether digital life recorder 600 may only download face glossary data 612 from the face glossary cache 616 of the peer digital life recorder. In addition, configuration constraints 640 may specify the types of face glossary data 612 that a peer digital life recorder may access. For instance, configuration constraints 640 may only allow glossary update component 638 to retrieve face glossary data 612 captured by the peer digital life recorder. Thus, face glossary data 612 downloaded to the peer digital life recorder from a remote repository, or from another peer digital life recorder may be excluded.

Figure 7:
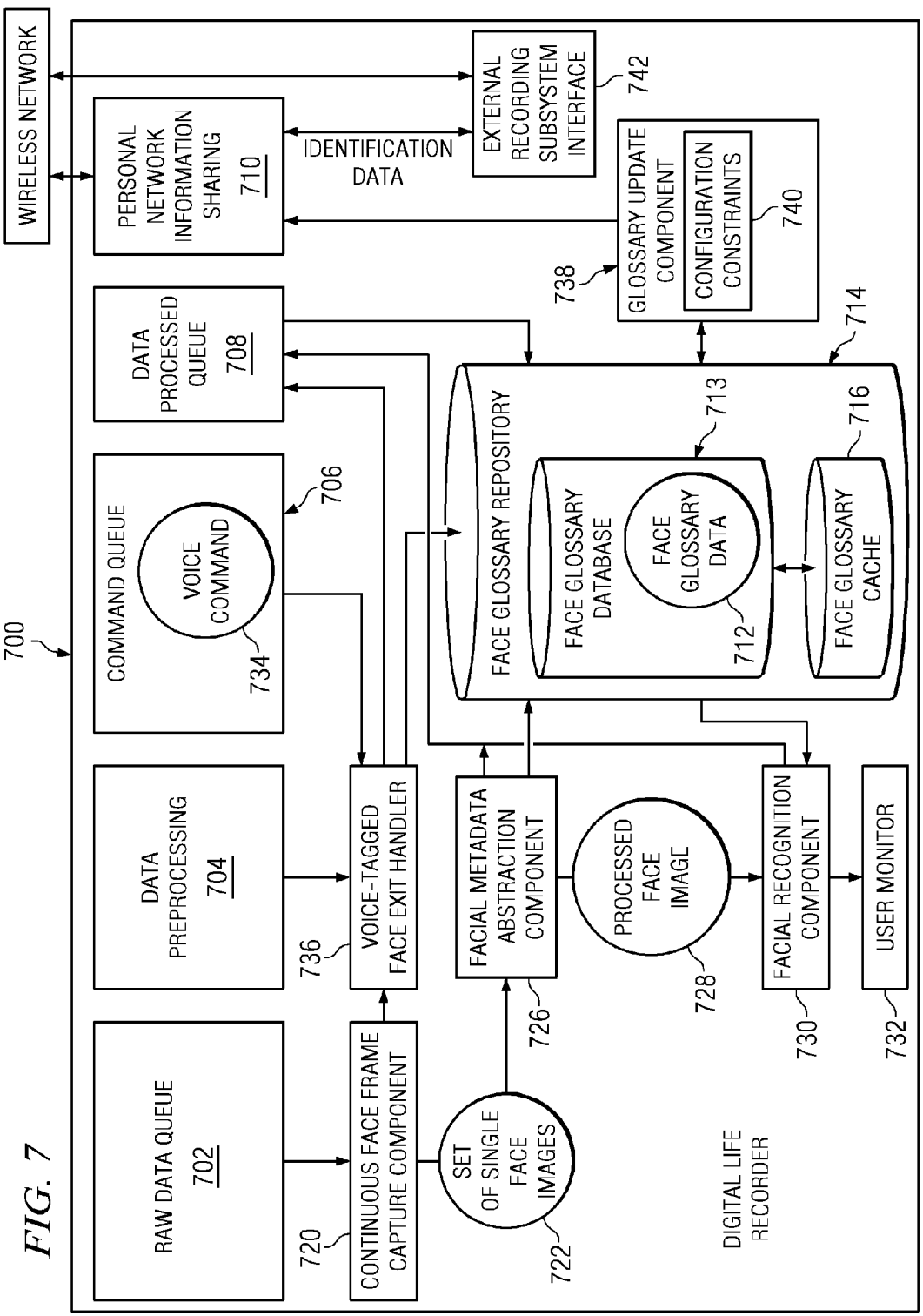
FIG. 7 is a block diagram of a digital life recorder configured to acquire streaming face glossary data in accordance with an illustrative embodiment.

In the embodiment illustrated in FIG. 7, face frame capture component may receive a continuous stream of images from raw data queue 702 and extracts faces from the images that may need to be identified. The data may be processed through the facial metadata abstraction component 726 and the resulting processed face images 728 stored in short term memory of facial recognition component 730. The facial recognition component 730 may compare the processed face images 728 to facial images in the face glossary repository 714. The facial recognition component 730 may also simultaneously receive broadcasts of personal facial images and metadata identification information through interfaces to external personal recording subsystems, such as external recording subsystem interface 742, through personal network information sharing 710. The facial recognition component 730 may compare the processed facial images 728 to the broadcast facial images and metadata identification information.

Personal network information sharing may enable the importing and exporting of a plurality of high resolution views of facial images and metadata information to and from an external recording subsystem through an external recording subsystem interface. The views may include, but are not limited to a side facial view, a full frontal view, an angular view, a diagonal view and other perspective views known to those skilled in the art. The views imported and exported through the personal network information sharing are specifically authorized for distribution and may therefore be of a higher quality and resolution than the continuous images streamed through the raw data queue 702. Personal network information sharing 710 may also enable the transfer of metadata that describes the facial images and the environment of the facial image. The environment may include, but is not limited to information such as location, time, biometrics and other such external condition data.

FIG. 8 is a block diagram showing the relationship between components of a repository subsystem in accordance with an illustrative embodiment. The recording subsystem may be, for example, recording subsystem 500 shown in FIG. 5. The components of repository subsystem 800 illustrated in FIG. 8 may be implemented in a data processing system, such as data processing system 200 as shown in FIG. 2.

Repository subsystem 800 includes a control system 802, a command queue 804, a network interface (not depicted), a relational storage means called the repository (repository database 808), personal information sharing interface 810, and an interface to the playback subsystem (Digital Life Playback and Repository System Monitor 812).

Control system 802 contains a command processor 814, which interprets and executes commands generated by either a keyboard interface 816, remote operation via the network, or scripts, which are executed (script processing 818) according to a scheduler 820. In addition, control system 802 manages, processes and threads (process control 822, system configuration 824, and any time coordination 826 that might be required.

A recording subsystem, such as recording subsystem 500 in FIG. 5, interfaces with a network, such as network 102 shown in FIG. 1, to upload data stored in the daily cache to repository subsystem 800. Repository subsystem 800 interfaces to the network to download the daily cache archive 806 previously stored by the recording subsystem.

Repository subsystem 800 stores the data into repository database 808. Repository database 808 includes two databases, digital life repository metadata database 828 and digital life repository information object storage 830, for long term storage and use. Digital life repository information object storage 830 stores the captured life data objects. Digital life repository metadata database 828 stores metadata used to index and describe the actual captured information objects that the Digital Life Recording Subsystem acquires during the life recording process. Additionally, repository database 808 may include information obtained through personal information sharing interface 810. Additional details of the network data sharing subsystem are described in more detail in FIG. 10 below.

On an ongoing basis, the indexing information in digital life repository metadata database 828 may be enhanced and refined by processes that study the capture data in the repository and update the index information (ongoing data and index refinement 819). An example of the refinement process includes analyzing audio data within an object to recognize words associated with the captured object. These words are then used as part of a full text search capability where the identified words are used as index information that points to the data objects that contains those words.

An interface, such as digital life playback and repository system monitor 812, exists between repository subsystem 800 and a playback subsystem. Digital life playback and repository system monitor 812 allows the playback subsystem to access the data existing in repository database 808 based on various searching techniques. The playback subsystem manages displaying of the data to a user. Digital life playback and repository system monitor 812 also manages the status and manipulation of the repository subsystem 800. Additional details of a playback subsystem are described in more detail in FIG. 11 below.

Figure 9:
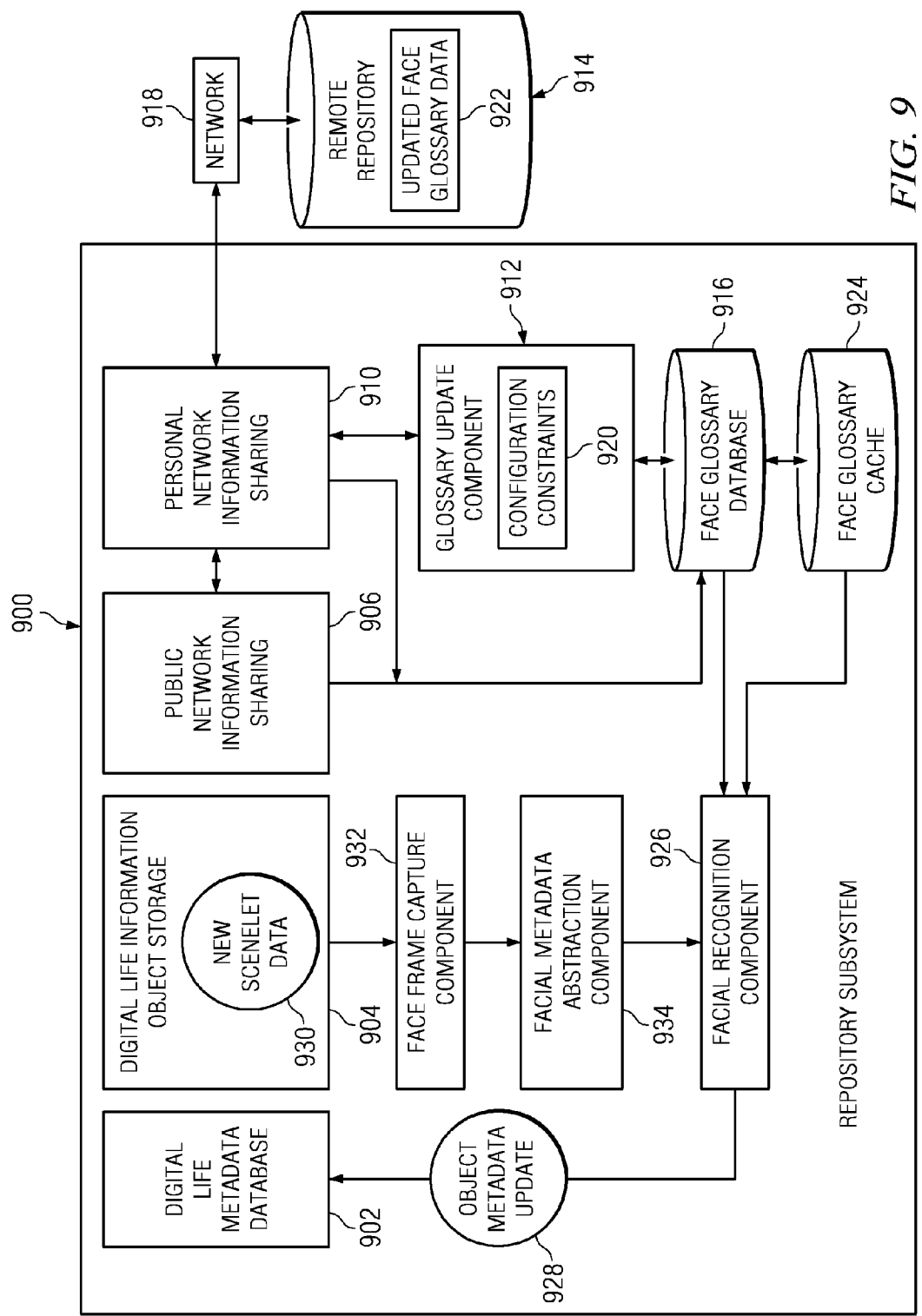
FIG. 9 is a block diagram showing an implementation of a repository subsystem configured for use with data process by a facial recognition component in accordance with an illustrative embodiment.

FIG. 9 is a block diagram showing an implementation of a repository subsystem configured for use with data processing by a facial recognition component in accordance with an illustrative embodiment. Repository subsystem 900 is a repository subsystem, such as repository subsystem 800 in FIG. 8.

Repository subsystem 900 includes digital life metadata database 902, digital life information object storage 904, public network information sharing 906, and personal network information sharing 910. Digital life metadata database 902 is a digital life metadata database, such as digital life metadata database 828 in FIG. 8. Digital life information object storage 904 is a digital life information object storage component, such as digital life information object storage 830 in FIG. 8. Public network information sharing 906 is a public network information sharing component, such as public network information sharing 528 in FIG. 5. Personal network information sharing 910 is a personal network information sharing component, such as personal network information sharing 526 in FIG. 5.

In addition, repository subsystem 900 includes glossary update component 912. Glossary update component 912 is a glossary update component, such as glossary update component 638 in FIG. 6. Glossary update component 912 retrieves face glossary data from remote repository 914 for storage into face glossary database 916. Remote repository 914 is one or more repositories storing face glossary data. For example, remote repository 914 may be network-accessible databases storing face glossary data. Remote repository 914 may be a centralized database storing face glossary data from one or more digital life recorders. In addition, remote repository 914 may be any device or component of a device that stores face glossary data. Remote repository 914 may also store face glossary data originating from other sources, such as, for example, television or movies, internet videos, or other sources of image data. Remote repository 914 may be accessed via network 918. Network 918 is a network, such as network 102 in FIG. 1.

Glossary update component 912 retrieves face glossary data from remote repository 914 in accordance with configuration constraints 920. Configuration constraints 920 are configuration constraints, such as configuration constraints 640 in FIG. 6. Configuration constraints 920 may specify a frequency or a time of day in which glossary update component 912 searches remote repository 914 for updated face glossary data 922. Updated face glossary data 922 is face glossary data that has been added to remote repository 914 after glossary update component 912 has performed its last search for face glossary data. In addition, updated face glossary data 922 may include new face glossary data stored in a face glossary databases and face glossary caches of a digital life recorder, such as face glossary database 613 and face glossary cache 616 in digital life recorder 600 in FIG. 6. Thus, the face glossary data stored on a user's digital life recorder that has not been transferred to face glossary repositories of a repository subsystem may be backed up in a remote location, such as the user's home computer.

Configuration constraints 920 may also specify categories of face glossary data that may be retrieved. For example, configuration constraints 920 may include a rule for selecting face glossary data of celebrities or missing children from remote repository 914. Additionally, configuration constraints 920 may specify an amount of face glossary data that may be retrieved in a data transfer session, or any other parameter involving the transfer of updated face glossary data 922 to face glossary database 916.

Glossary update component 912 downloads updated face glossary data 922 to face glossary database 916. Face glossary database 916 is a face glossary database, such as face glossary database 613 in FIG. 6. However, face glossary database 916 is located remote to a digital life recorder, such as digital life recorder 600 in FIG. 6. Likewise, face glossary cache 924 is a face glossary cache, such as face glossary cache 616 in FIG. 6, but located remotely to digital life recorder 600 in FIG. 6. Thus, face glossary database 916 and face glossary cache 924 may be stored in a user's home computer.

If necessary, facial recognition component 926 may process newly acquired face glossary data, such as updated face glossary data 922, which is downloaded to face glossary database 916 by glossary update component 912. Facial recognition component 926 is a facial recognition component, such as facial recognition component 630 in FIG. 6. In one embodiment, facial recognition component 926 processes the newly acquired face glossary data by extracting object metadata update 928 from updated face glossary data 922 for transmission to digital life metadata database 902 for long term storage. Object metadata update 928 is metadata describing faces of updated face glossary data 922. Object metadata update 928 is stored in digital life metadata database 902 for refining and improving the metadata associated with corresponding objects stored in digital life information object storage 904. For example, the more metadata associated with an object stored in digital life information object storage 904, the more accurate an identification may be.

Face glossary database 916 may also be updated with face glossary data derived from new scenelet data 930. New scenelet data 930 is scenelet data having facial images that have not yet been processed into face glossary data. New scenelet data 930 may be stored in digital life information object storage 904. Face frame capture component 932 processes new scenelet data 930 for generating face glossary data. Face frame capture component 932 operates in the same manner as face frame capture component 620 in FIG. 6. Thus, face frame capture component 932 locates new scenelet data 930 having images of faces and generates a set of single face images. The single face images are then sent to facial metadata abstraction component 934 for performing a facial metadata abstraction process. Facial metadata abstraction component 934 is a facial metadata abstraction component, such as facial metadata abstraction component 626 in FIG. 6.

Facial metadata abstraction component 934 generates processed face images that are sent to facial recognition component 926. Facial recognition component 926 then identifies the processed face images using face glossary data stored in face glossary cache 924 and optionally face glossary database 916. Once the processed face images are identified, facial recognition component 926 sends object metadata update 928 to digital life metadata database 902.

Figure 10:
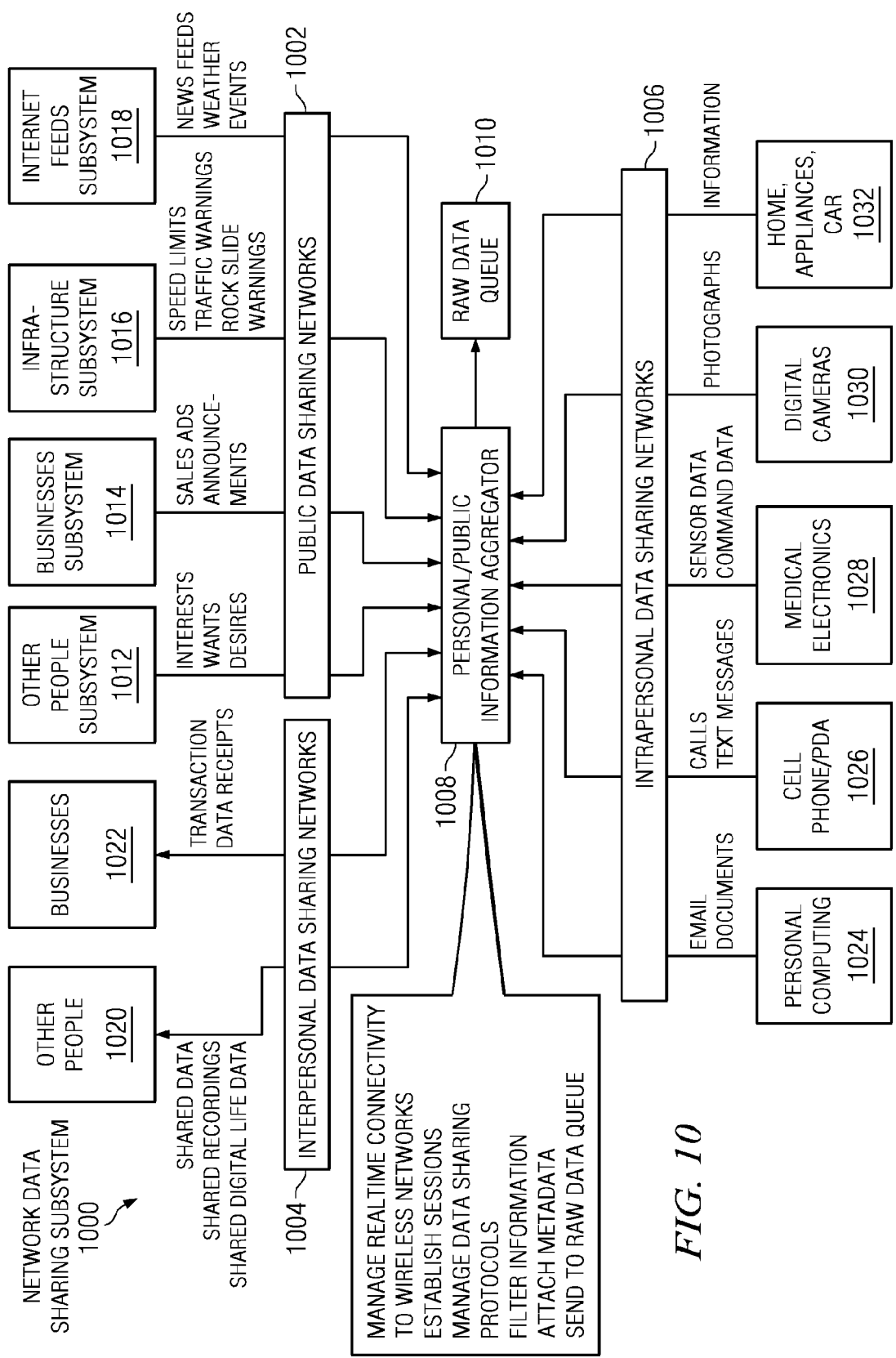
FIG. 10 is a block diagram of the relationship between components of a network data sharing subsystem in accordance with an illustrative embodiment.

FIG. 10 is a block diagram of the relationship between components of a network data sharing subsystem in accordance with an illustrative embodiment. The components of network data sharing subsystem 1000 illustrated in FIG. 10 may be implemented in a data processing system, such as data processing system 200 as shown in FIG. 2.

Network data sharing subsystem 1000 includes public data sharing network 1002, interpersonal data sharing network 1004, intrapersonal data sharing network 1006, and a personal/public information aggregator 1008.

Public data sharing network 1002 provides connectivity to information that is being locally broadcast as well as predefined Internet feeds. The system may be composed of wireless networks configured to connect automatically when detected. Hard networks may also be used to capture additional information.

Additionally, public data sharing network 1002 captures nearby information, from other people broadcasting information about themselves, via the other people subsystem 1012. This information might be information about their interests and desires. Public data sharing network 1002 also captures business information from nearby business broadcasts, such as, but not limited to, sales and advertisements via the businesses subsystem 1014.

Additionally, public data sharing network 1002 captures public and private infrastructure broadcasts via the infrastructure subsystem 1016. The public and private infrastructure information may include, but are not limited to, speed limits, traffic conditions/warnings, and weather condition warnings. Public data sharing network 1002 supports any network connectivity that allows Internet access via the Internet feeds subsystem 1018. Internet feeds subsystem 1018 is used to receive web based information, such as, but not limited to, news, weather, entertainment, and sports results.

Interpersonal data sharing network 1004 is more specific to the person being monitored than is public data sharing network 1002. Interpersonal data sharing network 1004 does not receive broadcasts. Instead, interpersonal data sharing network 1004 negotiates connections with other people 1020 and businesses 1022 to receive transaction oriented information for recording. For example, transaction information associated with transactions that occur between businesses and the person are recorded. The transaction information may include information about purchases, such as, but not limited to, price, model numbers, serial numbers, warranties, and receipts. Information shared from other people's digital life recording system is captured using a subsystem, such as other people 1020.

Intrapersonal data sharing network 1006 aggregates personal information about the person's life for recording. The personal information may be aggregated from a plurality of sources including, but not limited to, personal computing 1024, cell phone/personal digital assistants (PDA) 1026, medical electronics 1028, digital cameras 1030, and home appliances/car 1032. The information captured from personal computing 1024 may include, but is not limited to, emails, computer files, computer-based communications like instant messages or voice over IP (VOIP). Bluetooth or other wireless/wired connectivity may be used for interfacing the data to the digital life recorder.

Intrapersonal data sharing network 1006 may also capture cell phone conversations and PDA usage from cell phone/PDA 1026 using Bluetooth connectivity or other transmission means. Additionally, intrapersonal data sharing network 1006 may record the command and data associated with medical electronics 1028. Images may also be captured from digital cameras 1030. Digital cameras 1030 include cameras that are not already associated with the sensing subsystem. Other data may include information associated with home appliances/car 1032.

Personal/public information aggregator 1008 aggregates, organizes, formats, and attaches metadata to data acquired via public data sharing network 1002, interpersonal data sharing network 1004, and intrapersonal data sharing network 1006. The resultant aggregate is fed into the raw data queue 1010 of a recording subsystem, such as recording subsystem 500 in FIG. 5.

Figure 11:
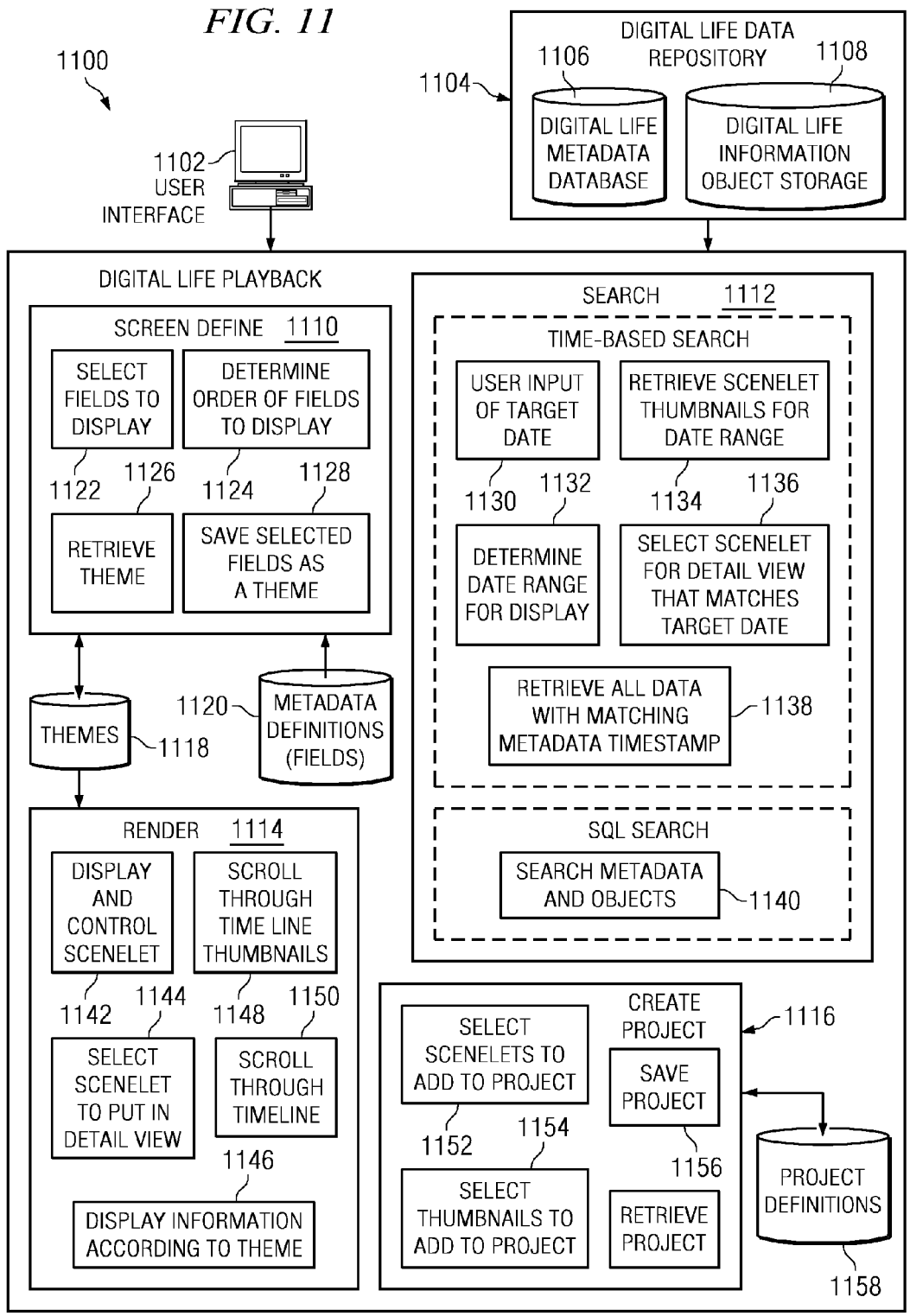
FIG. 11 is a block diagram of the components of a playback subsystem in accordance with an illustrative embodiment.

FIG. 11 is a block diagram showing the components of a playback subsystem in accordance with an illustrative embodiment. The components of playback subsystem 1100 illustrated in FIG. 11 may be implemented in a data processing system, such as data processing system 200 as shown in FIG. 2.

In this example, playback subsystem 1100 comprises of several subsystems, such as, but not limited to, screen define subsystem 1110, search subsystem 1112, render subsystem 1114, and create project subsystem 1116. Additionally, playback subsystem 1100 includes a user interface 1102 associated with the digital life recording system. User interface 1102 may be used to organize and present information stored in a data repository, such as repository database 808 shown in FIG. 8. Playback subsystem 1100 interfaces with digital life data repository 1104. Digital life data repository 1104 includes digital life metadata database 1106 and digital life information object storage database 1108. Digital life data repository 1104 may be similarly implemented as repository database 808 shown in FIG. 8.

Screen define subsystem 1110 provides an interface to receive user inputs, such as, but not limited to, selecting the type of information a user wants to view. The type of information may include, but is not limited to, video information, sound information, temperature sensor information, or any of the other information captured by the recording system or network data sharing system. The definition for these types of information and their mapping to the digital life data database is managed through the metadata definitions database 1120. The information can be organized on user interface 1102 and then saved in a themes database 1118 using the function save selected fields as a theme (block 1128). Saved themes may be retrieved from themes database 1118 using the retrieve theme (block 1126) functionality. Other functionality provided by screen define subsystem 1110 may include, but is not limited to, computer usable program code that allows a user to select fields to display (block 1122), and to determine order of fields to display (block 1124).

Search subsystem 1112 allows a user to input a date/time range to select the data that the user wants to view (block 1130). Search subsystem 1112 determines the initial date range to display on the user interface (block 1132) prior to searching digital life data repository 1104. Search subsystem 1112 retrieves the scenelet thumbnails from digital life information object storage database 1108 for the time slices within the date range (block 1134). A scenelet is a snippet of a scene. Additional details about a selected scenelet may be viewed (block 1136).

For all non-video information or metadata that is to be displayed on the screen, such as, but not limited to, sound and temperature, similar searching is performed and summaries retrieved for each time slice (block 1138). Detailed information for the requested date/time will also be retrieved. Similarly, a generic searching capability is provided that uses standard search language queries, such as Structured Query Language (SQL), to allow access to any aspect of the digital life data repository 1104 (block 1140).

Render subsystem 1114 is used to render the information retrieved, using search subsystem 1112, on user interface 1102. As stated above, the layout of user interface 1102 is defined using screen define subsystem 1110 and stored in themes database 1118. Render subsystem 1114 provides functionality to display, manipulate, and control a scenelet (block 1142), select a scenelet for a detail view (block 1144), display information according to theme (block 1146), scroll through time line of thumbnails (block 1148), and scroll through time line (block 1150).

Create project subsystem 1116 is used to support the creation of a saved set of information found in digital life data repository 1104. A user may, using user interface 1102, select either scenelets (block 1152) or thumbnails (block 1154), from the render subsystem 1114 and save the group of items as a project (block 1156) in a project definitions database 1158. Additionally, previously saved projects may be retrieved from the project definitions database 1158 using user interface 1102.

Figure 12:
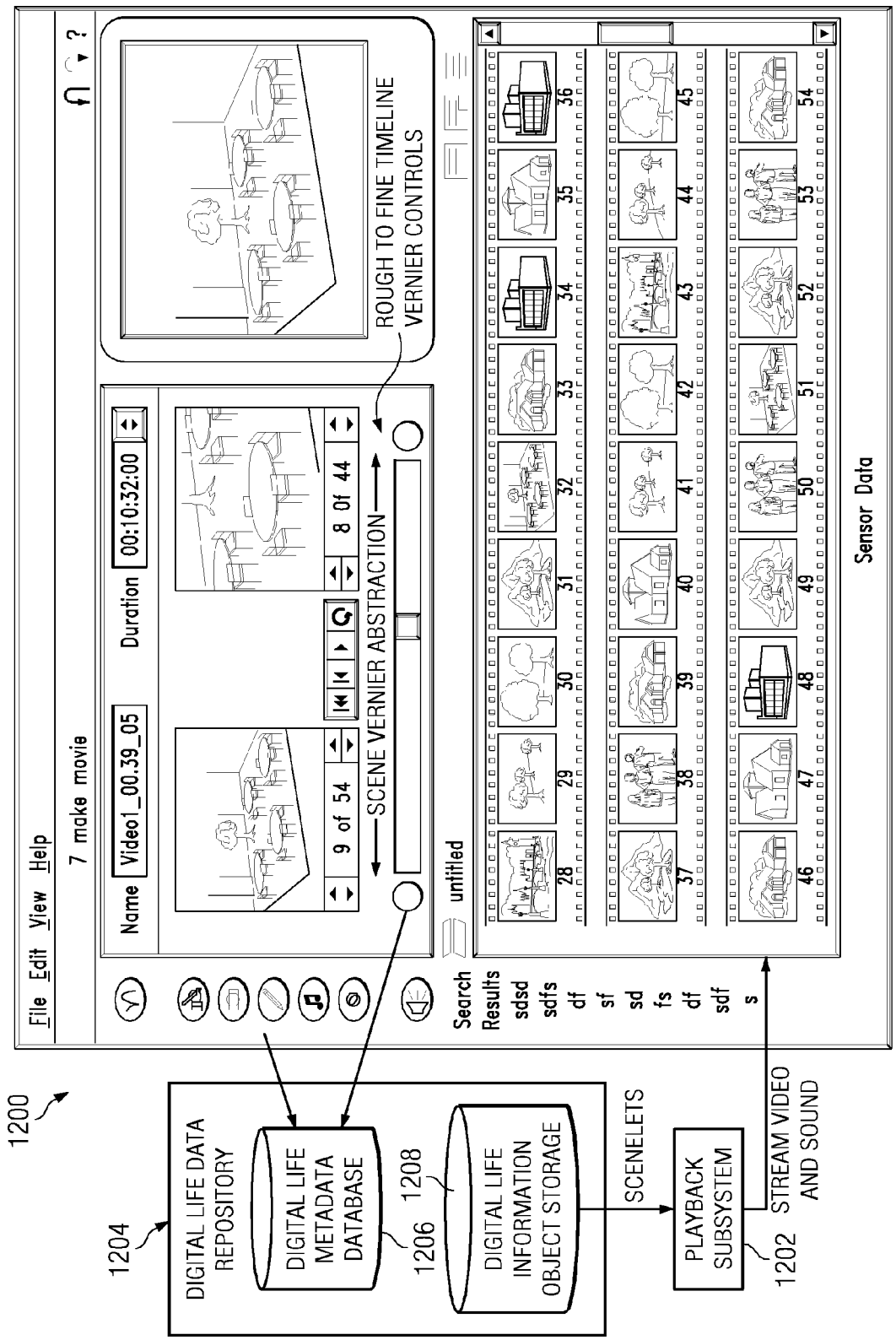
FIG. 12 is a diagram depicting a user interface associated with the playback subsystem in accordance with an illustrative embodiment.

With reference now to FIG. 12, a user interface 1200 associated with a playback subsystem 1202 is depicted in accordance with an illustrative embodiment. Playback subsystem 1202 uses data acquired from a digital life data repository 1204. Digital life data repository 1204 contains digital life metadata database 1206 and digital life information object storage database 1208. Digital life data repository 1204 may be similarly implemented as repository database 808 shown in FIG. 8.

The results associated with a search are depicted on the left hand side of user interface 1200. Additionally, user interface 1200 provides a mechanism for adjusting the timeline vernier. The timeline vernier controls the precision of time. Thus, a user can adjust from a rough timeline vernier to a more precise/fine timeline vernier. Scenelets associated with a selected result is presented in the bottom half of user interface 1200.

Figure 13:
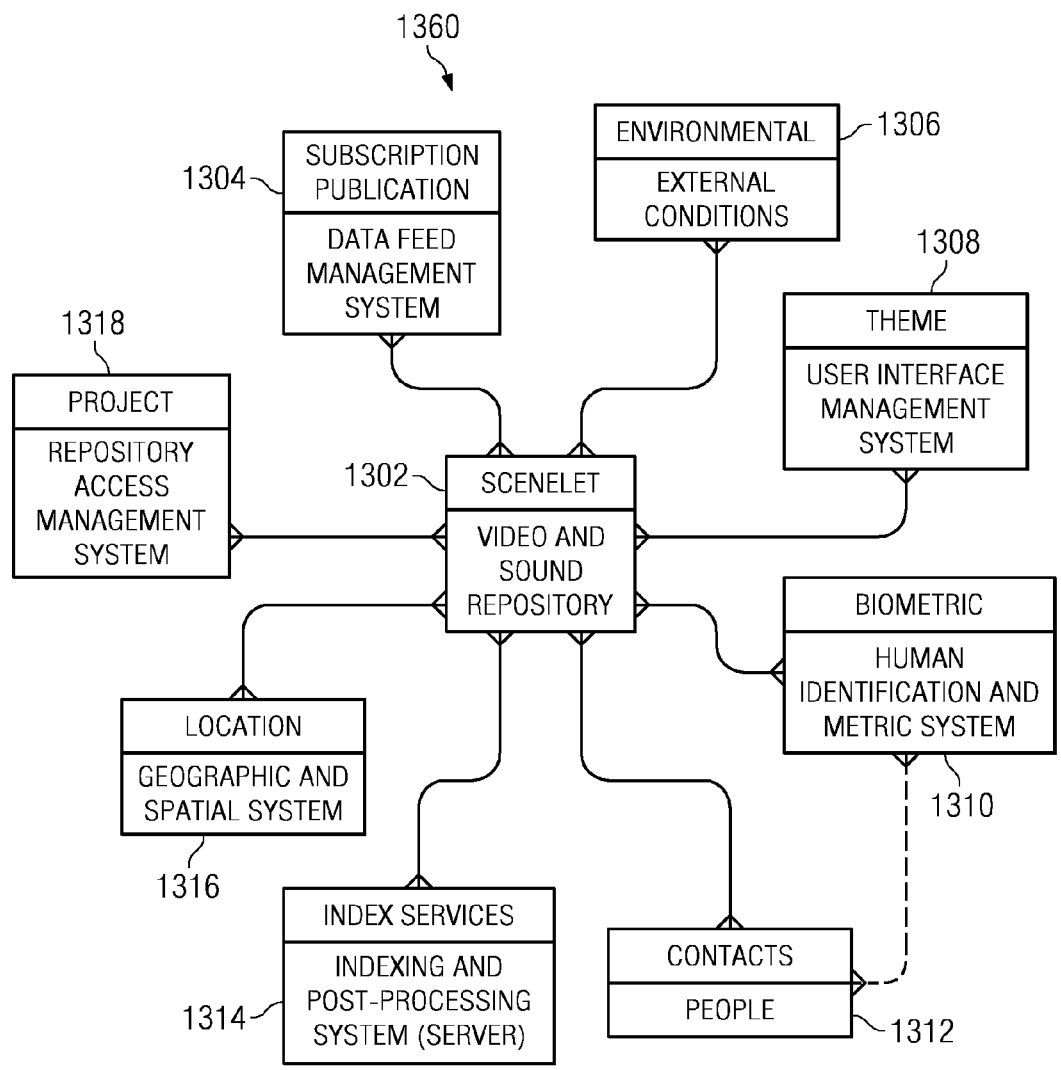
FIG. 13 is a diagram depicting a data model in accordance with an illustrative embodiment.

FIG. 13 is a diagram of a data model in accordance with an illustrative embodiment. Digital life conceptual data model 1300 may include, but is not limited to, the following subsystems: scenelet 1302, subscription/publication 1304, environmental 1306, theme 1308, biometric 1310, contacts 1312, index services 1314, location 1316, and project 1318.

Scenelet 1302 organizes and manages the image and sound files. Subscription/publication 1304 manages the external data feeds into and out of the digital life system, such as digital life recorder 300 shown in FIG. 3. Environmental 1306 captures and manages environmental characteristics related to the scenelet data. Theme 1308 allows users to customize and manage their digital life system interfaces and experiences. Biometric 1310 captures and manages biometric information associated with human contacts within the scenelets. Contacts 1312 is a repository of known contacts. Index services 1314 provides post processing capability to further analyze and categorize scenelet data. Location 1316 captures and manages specific location related details during a scenelet. Project 1318 provides an access management system that allows users to customize data retrieval.

Figure 14:
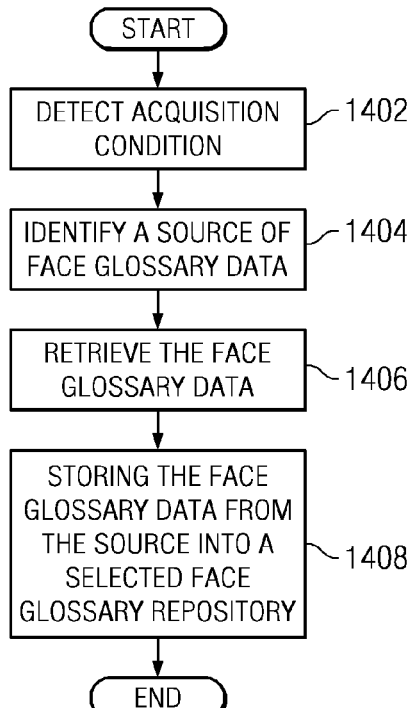
FIG. 14 is a flowchart of a high level process for acquiring face glossary data in accordance with an illustrative embodiment.

FIG. 14 is a flowchart of a high level process for acquiring face glossary data in accordance with an illustrative embodiment. The process depicted in FIG. 14 may be implemented by a system, such as digital life recorder 300 in FIG. 3.

The process begins by detecting an acquisition condition (step 1402). The acquisition condition is an acquisition condition, such as acquisition condition 312 in FIG. 3. Thereafter, process identifies a source of face glossary data (step 1404). The source of face glossary data may be a raw data queue, such as raw data queue 516 in FIG. 5. The source of face glossary data may also be a peer digital life recording system, such as digital life recorder 117 in FIG. 1. In addition, the source of face glossary data may be a remote repository, such as remote repository 922 in FIG. 9.

The process then retrieves the face glossary data from the source (step 1406). The process stores the face glossary data from the source into a selected face glossary repository (step 1408) and the process terminates. In one embodiment, the selected face glossary repository may include a face glossary database and a face glossary cache. In another embodiment, the selected face glossary repository may be a face glossary database or a face glossary cache. In addition, the face glossary database and face glossary cache may be an on-person face glossary database and an on-person face glossary cache.

Figure 15:
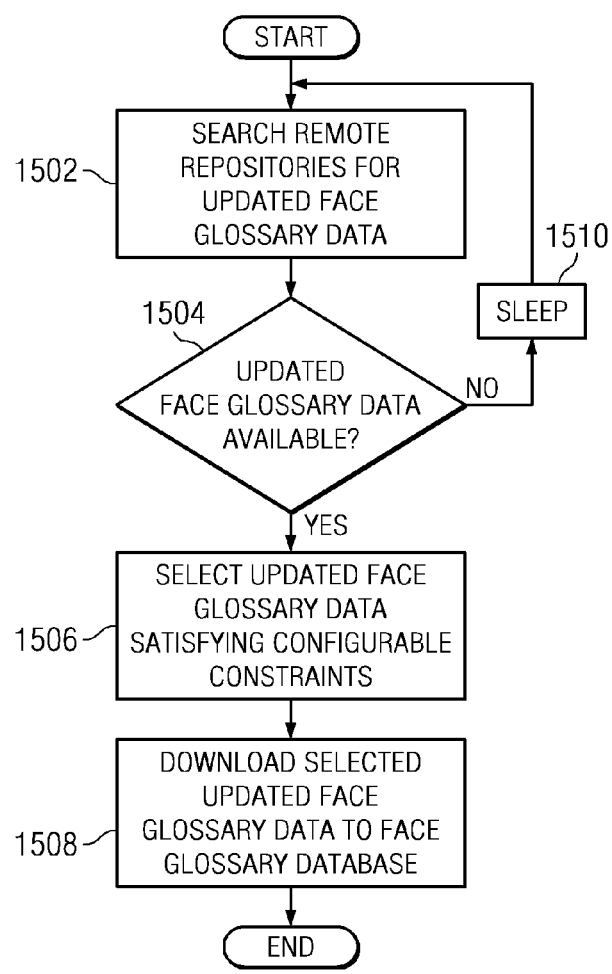
FIG. 15 is a flowchart of a process for retrieving face glossary data in accordance with an illustrative embodiment.

FIG. 15 is a flowchart of a process for retrieving face glossary data in accordance with an illustrative embodiment. The process depicted in FIG. 15 may be implemented by a software component, such as glossary update component 912 in FIG. 9.

The process beings by searching a remote repository for updated face glossary data (step 1502). Updated face glossary data is face glossary data, such as updated face glossary data 922 in FIG. 9. The process then makes the determination as to whether updated face glossary data exists (step 1504).

If the process makes the determination that updated face glossary data exists, then the process selects updated records satisfying configurable constraints (step 1506). The process then downloads the selected updated face glossary data to a face glossary database (step 1508), such as face glossary database 916 in FIG. 9.

Returning now to step 1504, if the process makes the determination that updated face glossary data is not available, then the process sleeps (step 1510). The process sleeps for an amount of time specified by configurable constraints, such as configuration constraints 920 in FIG. 9. Thereafter, the process returns to step 1502.

Figure 16:
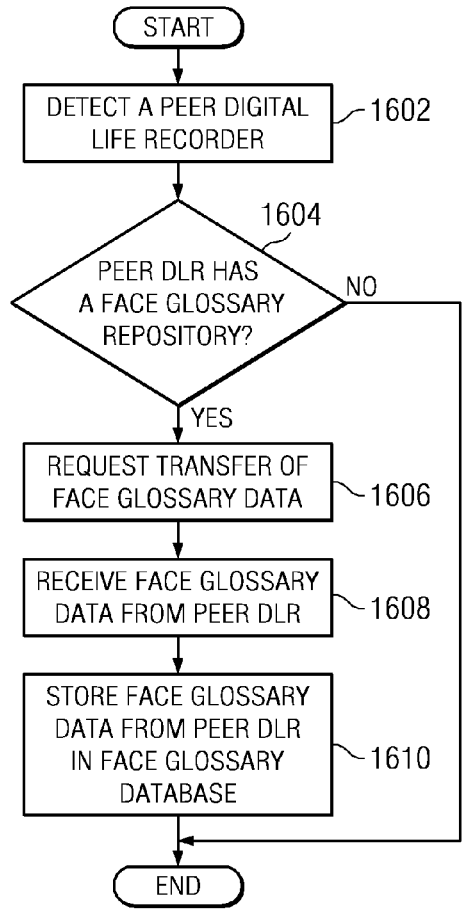
FIG. 16 is a flowchart of a process for retrieving face glossary data from a peer digital life recorder in accordance with an illustrative embodiment.

FIG. 16 is a flowchart of a process for retrieving face glossary data from a peer digital life recorder in accordance with an illustrative embodiment. The process depicted in FIG. 16 may be performed by a software component, such as glossary update component 638 in FIG. 6.

The process begins by detecting a peer digital life recorder (step 1602). The peer digital life recorder may be detected by receiving a notification from personal network information sharing component 526 in FIG. 5.

The process makes the determination as to whether the peer digital life recorder has a face glossary repository (step 1604). The face glossary repository may include a face glossary database and a face glossary cache. In some embodiments, the face glossary repository may include only the face glossary database or the face glossary cache. Many varied configurations are possible as would be understood by one skilled in the art. If the process makes the determination that the peer digital life recorder does not have a face glossary repository, then the process terminates. However, if the process makes the determination that the peer digital life recorder does have a face glossary repository, the process requests a transfer of the face glossary data stored in the face glossary repository of the peer digital life recorder (step 1606). The process may request the transfer of face glossary data in accordance with configurable constraints of the glossary update component. The configurable constraints may be configuration constraints 640 in FIG. 6. The configurable constraints may specify whether the glossary update component may transfer face glossary data stored in a face glossary database and/or a face glossary cache of the face glossary repository in the peer digital life recorder.

The process receives the face glossary data from the peer digital life recorder (step 1608). Thereafter, the process stores the face glossary data from the peer digital life recorder in a face glossary database (step 1610) and terminates.

Figure 17:
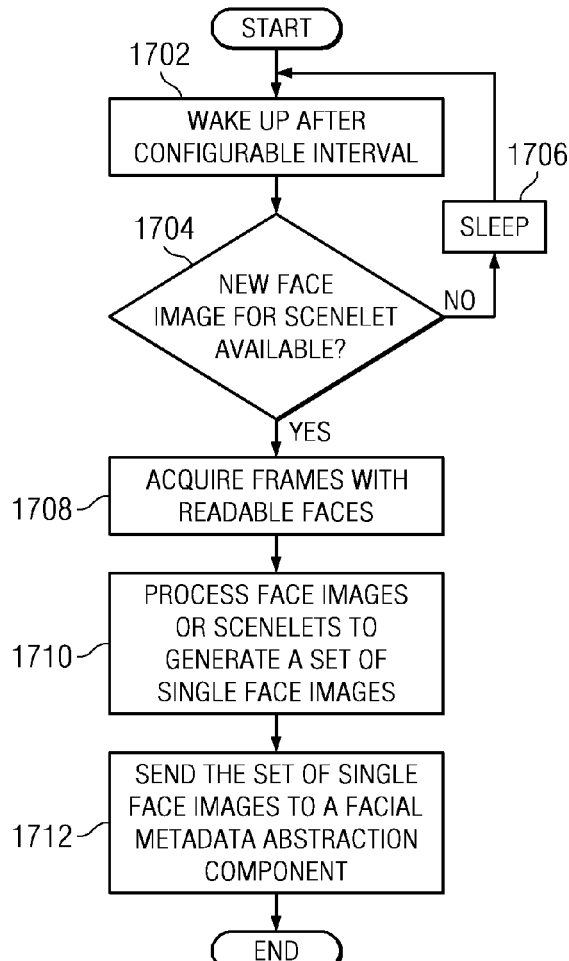
FIG. 17 is a flowchart of a process for generating a set of single face images as a step in retrieving face glossary data in accordance with an illustrative embodiment.

FIG. 17 is a flowchart of a process for generating a set of single face images as a step retrieving face glossary data in accordance with an illustrative embodiment. The process depicted in FIG. 17 may be implemented by a software component, such as face frame capture component 620 in FIG. 6 and face frame capture component 932 in FIG. 9.

The process begins by waking up after a configurable interval (step 1702). The configurable interval may be specified by the configurable constraints, such as configuration constraints 640 in FIG. 6. The process makes the determination as to whether new face images or scenelets are available (step 1704). New face images may be found in a raw data queue, such as raw data queue 602 in FIG. 6. New scenelets may be found in a digital life information object storage component, such as digital life information object storage 904 in FIG. 9. If the process makes the determination that new face images or scenelets are not available, the process sleeps (step 1706) and returns to step 1702.

If the process makes the determination that new face images or scenelets are available, the process acquires the new face images or scenelets with readable faces (step 1708). The new face images or scenelets are processed to generate a set of single face images (step 1710). The set of single face images are a set of single face images, such as set of single face images 622 in FIG. 6.

The process sends the set of single face images to a facial metadata abstraction component (step 1712) and terminates. The facial metadata abstraction component is a facial metadata abstraction component, such as facial metadata abstraction component 626 in FIG. 6.

Figure 18:
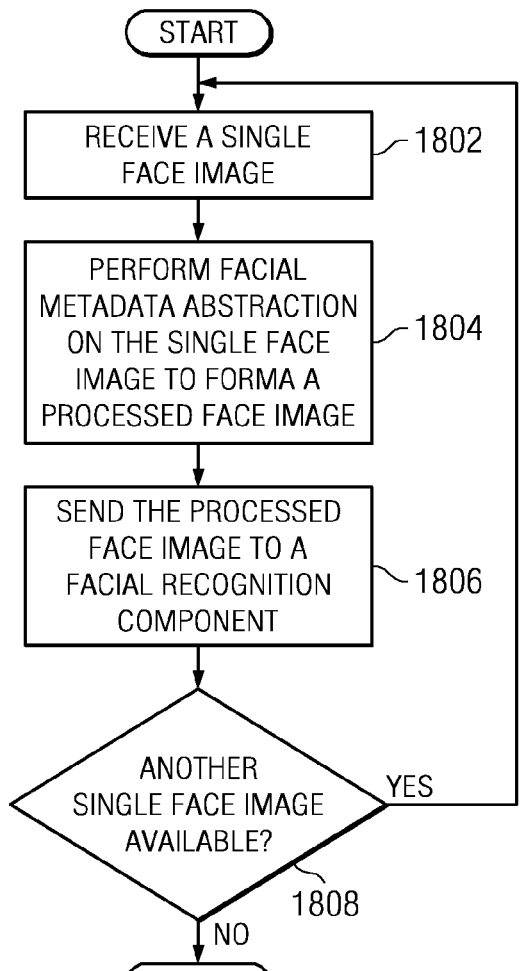
FIG. 18 is a flowchart of process for generating processed face images as a step in retrieving face glossary data in accordance with an illustrative embodiment.

FIG. 18 is a flowchart of a process for performing facial metadata abstraction as a step in retrieving face glossary data in accordance with an illustrative embodiment. The process depicted in FIG. 18 may be performed by a software component, such as facial metadata abstraction component 626 in FIG. 6.

The process begins by receiving a single face image (step 1802). The process performs facial metadata abstraction on the single face image to generate a processed face image (step 1804). The processed face image is a processed face image, such as processed face image 628 in FIG. 6. The process sends the single face image to a facial recognition component (step 1806).

Thereafter, the process makes the determination as to whether another single face image is available for processing (step 1808). If another single face image is available for processing, the process returns to step 1802. Otherwise, the process terminates.

Figure 19:
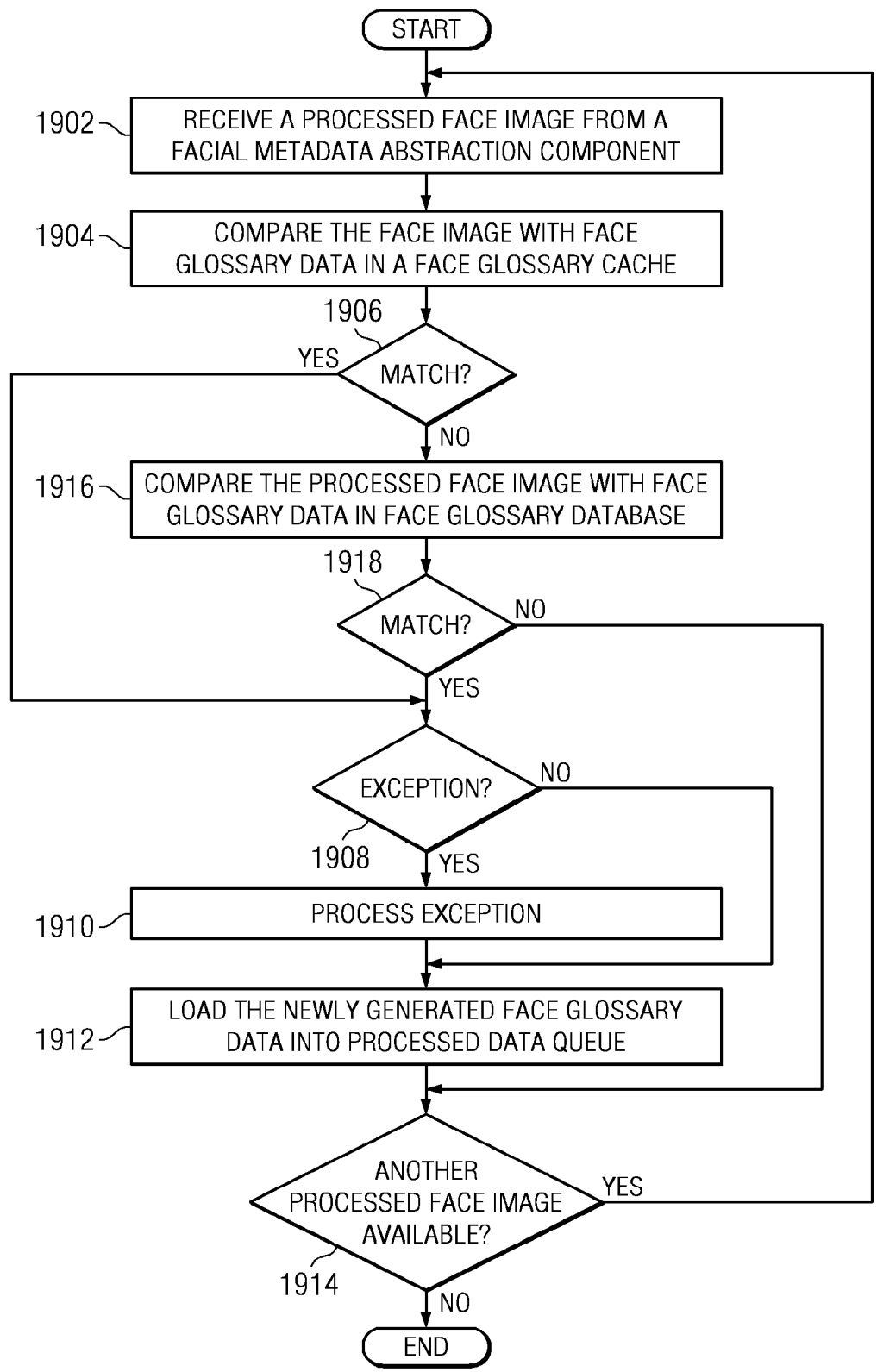
FIG. 19 is a flowchart of a process for identifying faces from processed face images as a step in retrieving face glossary data in accordance with an illustrative embodiment.

FIG. 19 is a flowchart of a process for identifying faces from processed face images as a step in retrieving face glossary data in accordance with an illustrative embodiment. The process may be performed by a face recognition component, such as face recognition component 630 in FIG. 6.

The process begins by receiving a processed face image from a facial metadata abstraction component (step 1902). The process compares the processed face image with face glossary data in a face glossary cache (step 1904). The process makes the determination as to whether a match is detected (step 1906).

If the process makes the determination that a match is detected, the process makes the determination as to whether an exception exists (step 1908). If an exception exists, the exception is processed (step 1910). The process loads the newly generated face glossary data into a processed data queue (step 1912). Thereafter, the process makes the determination as to whether another processed face image is available (step 1914).

If another processed face image is not available, the process terminates. However, if another processed face image is available, the process returns to step 1902.

Returning to step 1906, if the process makes the determination that a match is not detected, the process compares the processed face image with face glossary data in a face glossary database (step 1916). The process makes the determination as to whether a match exists (step 1918). If a match exists, the process continues to step 1908. Otherwise, if a match does not exist, the process continues to step 1914.

With respect to step 1908, if the process makes the determination that no exception exists, the process continues to step 1912.

Figure 20:
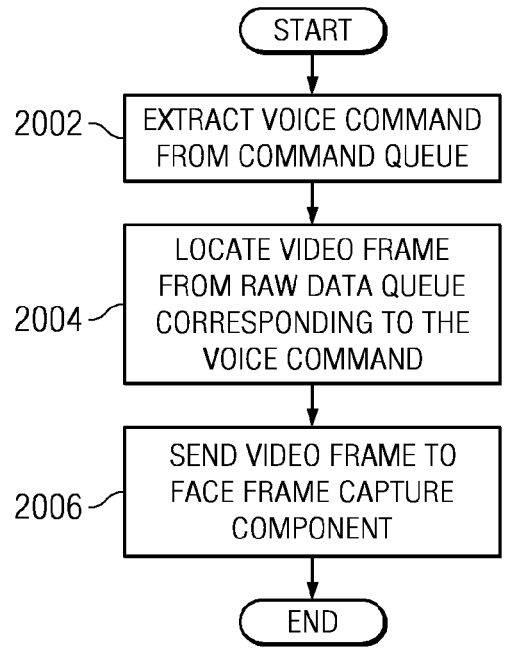
FIG. 20 is a flowchart of a process for retrieving face glossary data in response to detecting a voice command in accordance with an illustrative embodiment.

FIG. 20 is a flowchart of a process for retrieving face glossary data in response to detecting a voice command in accordance with an illustrative embodiment. The process depicted in FIG. 20 may be performed by a software component, such as voice-tagged face exit handler 636 in FIG. 6.

The process begins by extracting a voice-generated command from a command queue (step 2002). The process then locates a video frame from the raw data queue corresponding to the voice command (step 2004). Thereafter, the process sends the video frame to a face frame capture component for further processing (step 2006) with the process terminating thereafter. The face frame capture component processes the video frame in the manner described in FIG. 17 above.

Figure 21:
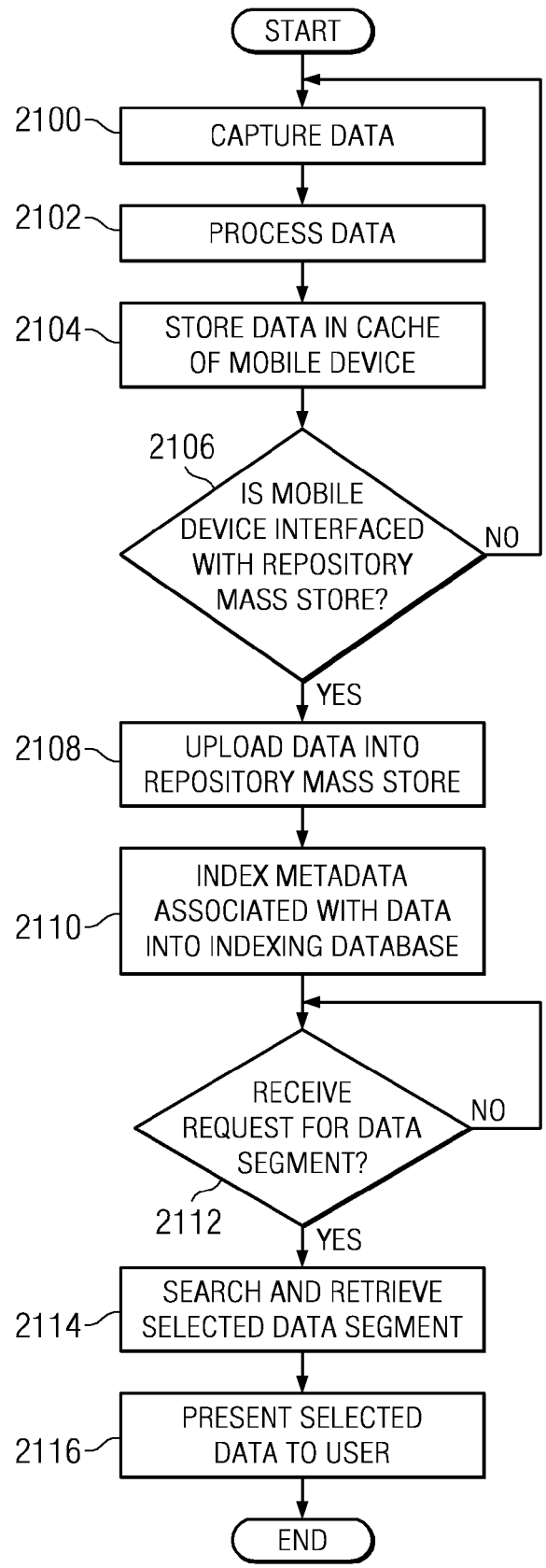
FIG. 21 is a high-level flowchart of a process for capturing, storing, and presenting data in accordance with an illustrative embodiment.

FIG. 21 is a high-level flowchart of a process for capturing, storing, and presenting data in accordance with an illustrative embodiment. The process illustrated in FIG. 21 may be implemented in a digital life recording system, such as digital life recorder 300 shown in FIG. 3.

The process begins by capturing data associated with daily activities of a person using data capturing devices (step 2100). The captured data is processed by a mobile device associated with the person (step 2102). The data is stored in a cache of the mobile device (step 2104). The process monitors the mobile device to determine when the mobile device is interfaced with a repository mass store (step 2106). Interfacing may occur when the mobile device is in the vicinity of the repository mass store and connection is established via a wireless transmission link. Interfacing may also occur when the mobile device is docked to a repository mass store. The process continues the process of capturing (step 2100), processing (step 2102), and storing (step 2104) the data until a determination is made that the mobile device is interfaced with a repository mass store.

In response to interfacing the mobile device to a repository mass store, the process uploads the data stored in the cache of the mobile device into the repository mass store (step 2108). Metadata associated with the data, is indexed into an indexing database (step 2110). The process monitors for a request, from a user, to retrieve a selected data segment (step 2112). In response to receiving a request for a selected data segment, the process performs a search and retrieves the selected data segment from the repository mass store (step 2114). The process presents the selected data segment to the user (step 2116), with the process terminating thereafter.

Figure 22:
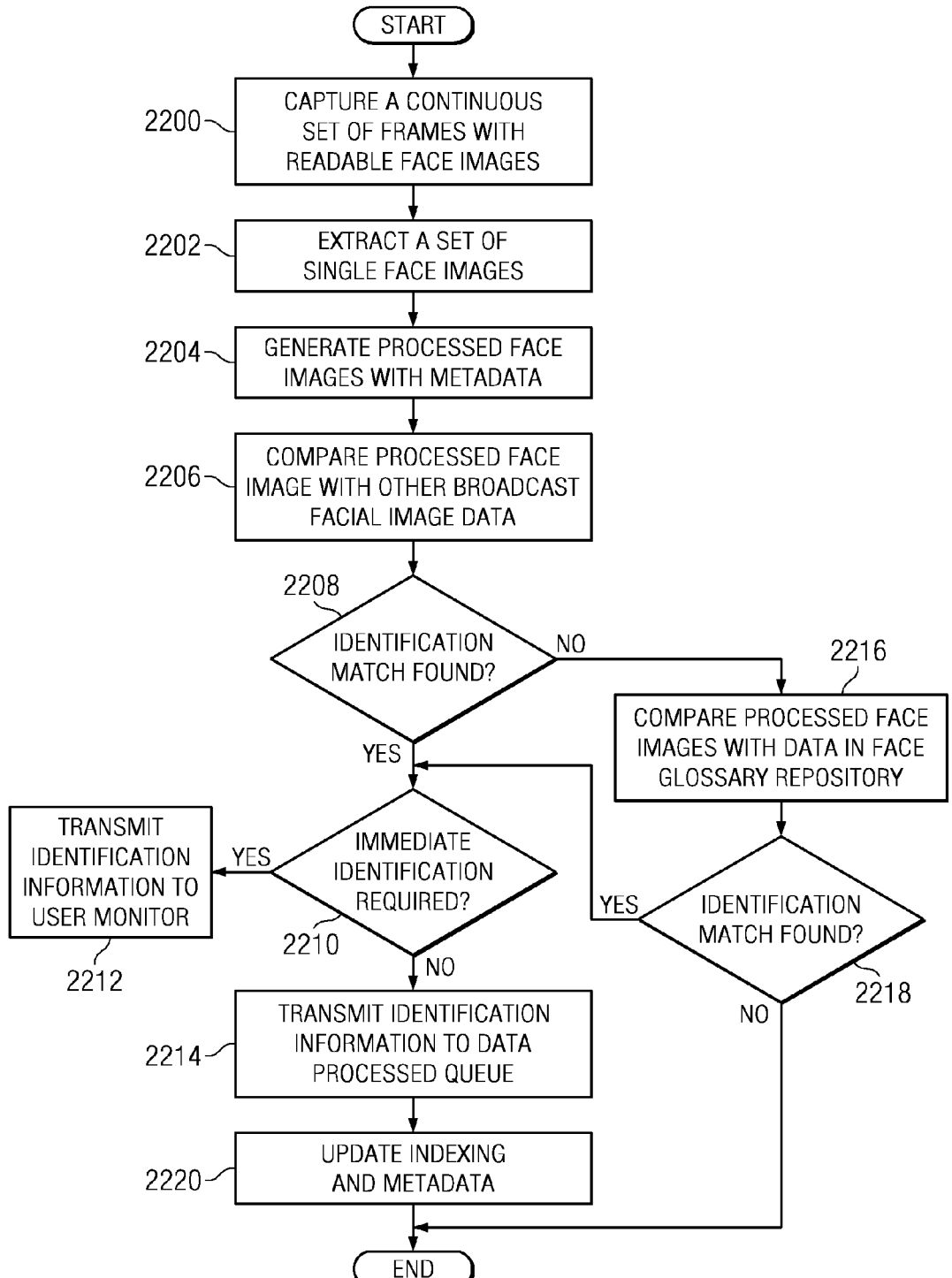
FIG. 22 is a flowchart of a process for capturing and indexing streaming facial data in accordance with an illustrative embodiment.

FIG. 22 illustrates a flowchart of the embodiment of FIG. 7 that features continuous face frame capture. A continuous stream of images are input into a recording system and a set of frames with facial images are captured from the continuous image stream at a block 2200. At a block 2202, a set of single face images are extracted. At a block 2204, processed facial images with metadata may be generated by performing a metadata abstraction on the single facial images. At a block 2206, the processed facial images may be compared to facial image data broadcast for sharing from an external recording subsystem through the personal network info sharing. Further details of broadcasting facial image data for sharing from an external recording subsystem may be referenced at FIG. 23.

The process determines at a block 2208 whether there is a match between the processed facial image and the broadcast facial images from the external recording subsystem. If a match is obtained at block 2208 then the identification information may be transmitted to a user monitor at a block 2212, if it is determined at a block 2210 that an immediate identification is required. A determination at a block 2210 that an immediate verification is not required may result in the identification information being transmitted to the data processed queue at a block 2214.

Returning to decision box 2208, it may be determined that an identification match between the broadcast facial image and the processed face image does not exist. At a block 2216, the process compares the process face images with facial image data in the face glossary repository and checks for an identification match at a block 2218. If an identification match exists, the process continues to decision block 2210 to determine whether an immediate verification is required by some process as detailed previously. If no identification match exists at a block 2218, the process ends. At a block 2220, the indexing and metadata of the data processed queue may be updated using the identification information.

Figure 23:
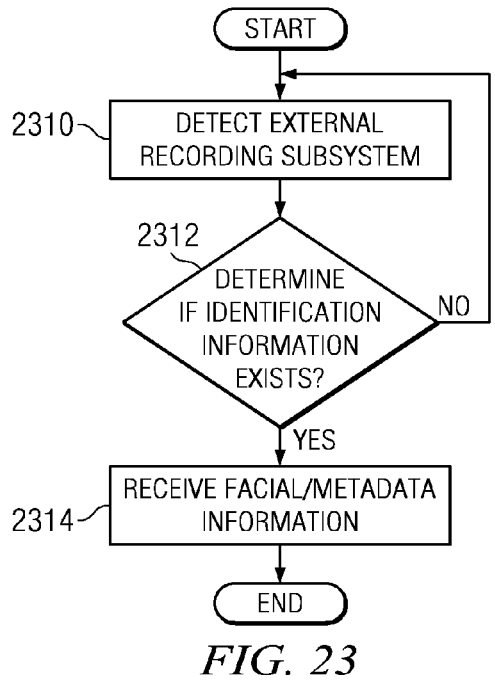
FIG. 23 is a flowchart detailing the process of receiving facial information broadcast by an external recording subsystem according to an illustrative embodiment.

FIG. 23 details the process of receiving information broadcast form an external recording subsystem. At a block 2310, the system connectivity of an external recording subsystem may be detected. It may be determined at a block 2312 that the external recording subsystem has identification information including facial images and metadata describing the facial images ready to be transmitted. If it is determined that no information exists, the process waits until it is within proximity of an external recording subsystem that is ready to transmit identification information. At a block 2314, facial metadata information and image information may be received. The facial metadata and image identification information may be stored in a face glossary repository or may be used by other components of a resident recording subsystem.

Figure 24:
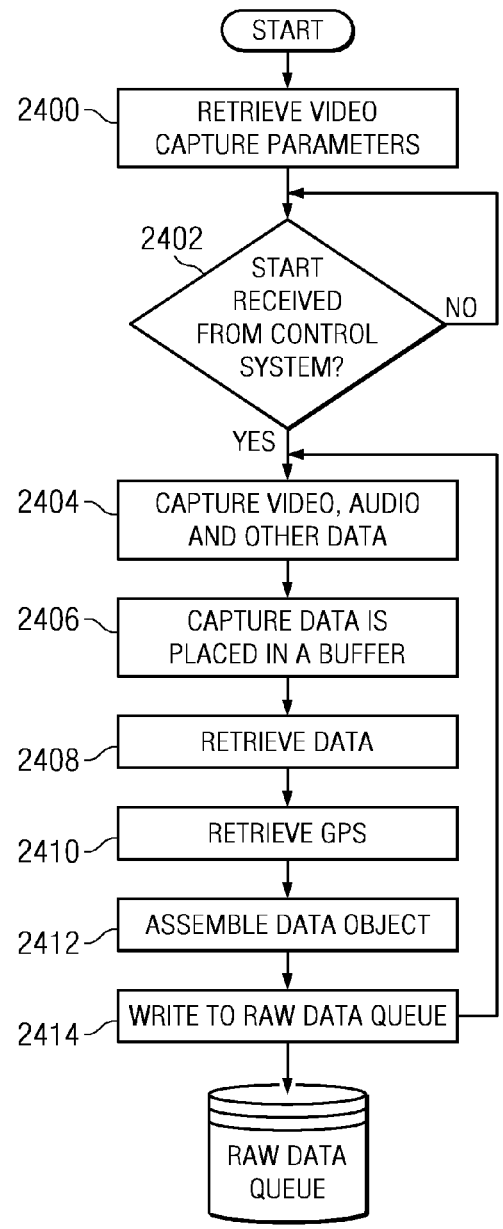
FIG. 24 is a flowchart of a process for capturing life data in accordance with an illustrative embodiment.

FIG. 24 is a flowchart of a process for capturing life data is depicted in accordance with an illustrative embodiment. The process illustrated in FIG. 24 may be implemented in a digital life recording system, such as digital life recorder 300 shown in FIG. 3.

The process begins by retrieving the video capture parameters (step 2400). The process monitors for start request from the control system (step 2402). In response to receiving a start request from the control system, the process captures the video, audio, and other data from the data capturing devices associated with a person (step 2404). The captured data is placed in a buffer for temporary storage (step 2406). The process retrieves data from the buffer (step 2408). Additionally, the process retrieves data associated with a global positioning system device (step 2410). The process assembles a data object by associating the data associated with a global positioning system device with the data retrieved from the buffer (step 2412). The process writes the data object to a raw data queue (step 2414). The process repeats steps 2404-2414 until all the data in the buffer is written to the raw data queue.

Figure 25:
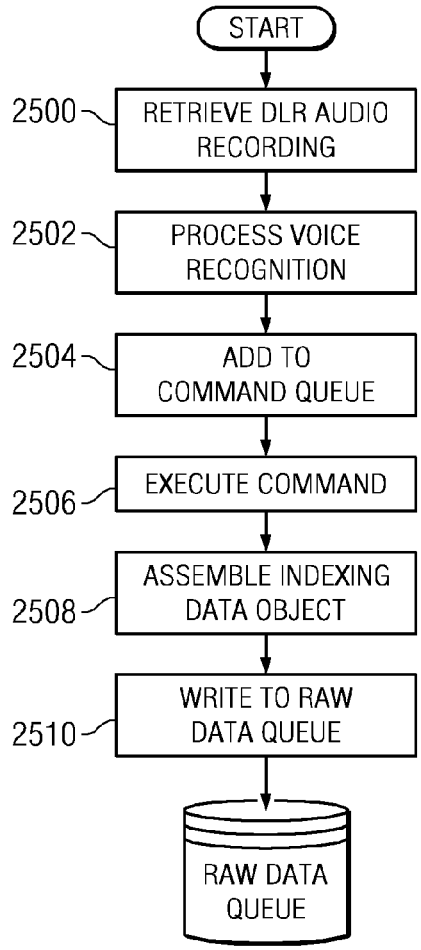
FIG. 25 is a flowchart of a process for using voice commands for tagging life data objects in accordance with an illustrative embodiment.

FIG. 25 is a flowchart of a process for improving the indexing of the stored data by tagging life data objects in accordance with an illustrative embodiment. The process illustrated in FIG. 25 may be implemented in a digital life recording system, such as digital life recorder 300 shown in FIG. 3.

The process begins by retrieving audio recording associated with a digital life recording system (step 2500). The audio recording is processed through a voice recognition subsystem to interpret voice commands (step 2502). The process adds the voice commands to a command queue (step 2504). Commands may also be added to the command queue using a mouse or keyboard. The tagging command includes a timestamp and a descriptive text index tag string. The process executes the commands stored in the command queue (step 2506). The process assembles the descriptive text index tag string and timestamp into an indexing data object (step 2508). The process writes the tagged data object to a raw data queue (step 2510) for later placement into the metadata database, with the process terminating thereafter.

Figure 26:
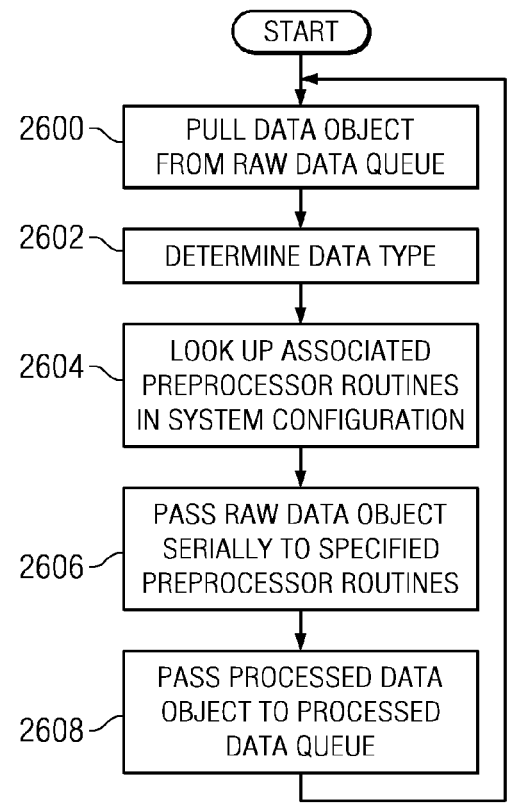
FIG. 26 is a flowchart of a process for preprocessing raw recorded data in accordance with an illustrative embodiment.

FIG. 26 is a flowchart of a process for preprocessing raw recorded data in accordance with an illustrative embodiment. The process illustrated in FIG. 26 may be implemented in a digital life recording system, such as digital life recorder 300 shown in FIG. 3.

The process begins by pulling a data object from the raw data queue (step 2600). The process determines the data type of pulled data object (step 2602). The process looks up the associated preprocessor routines in system configuration (step 2604). The process passes the raw data object serially to the specified preprocessor routines (step 2606). The specified preprocessor routines return the processed data object to the process. The process then passes the processed data object to a processed data queue (step 2608). The process loops and repeats steps 2600-2608.

Figure 27:
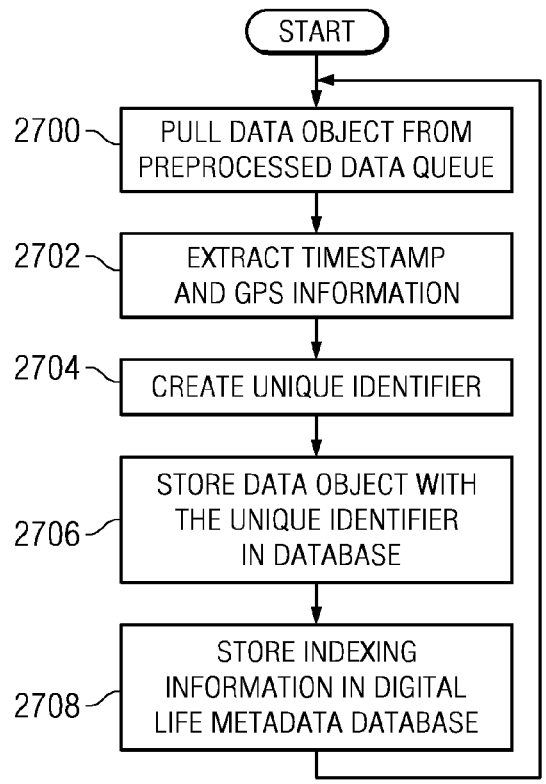
FIG. 27 is a flowchart of a process for creating a unique identifier for indexing and storing data objects in accordance with an illustrative embodiment.

FIG. 27 is a flowchart of a process for creating a unique identifier for indexing and storing data objects in accordance with an illustrative embodiment. The process illustrated in FIG. 27 may be implemented in a digital life recording system, such as digital life recorder 300 shown in FIG. 3.

The process begins by pulling a data object from the preprocessed data queue (step 2700). The process extracts the timestamp and global positioning system (GPS) information from the data object (step 2702). The process creates a unique identifier for identifying the data object (step 2704). The process then stores the data object along with the unique identifier in a digital life information object storage database (step 2706), such as digital life repository information object storage 830 shown in FIG. 8. The process stores indexing information, such as, but not limited to, a timestamp, global positioning system information, the unique identifier, and the physical location of where the data object is stored in the digital life information object storage database, in a digital life repository metadata database (step 2708), such as digital life repository metadata database 828 shown in FIG. 8. The process loops and repeats steps 2700-2708.

Figure 28:
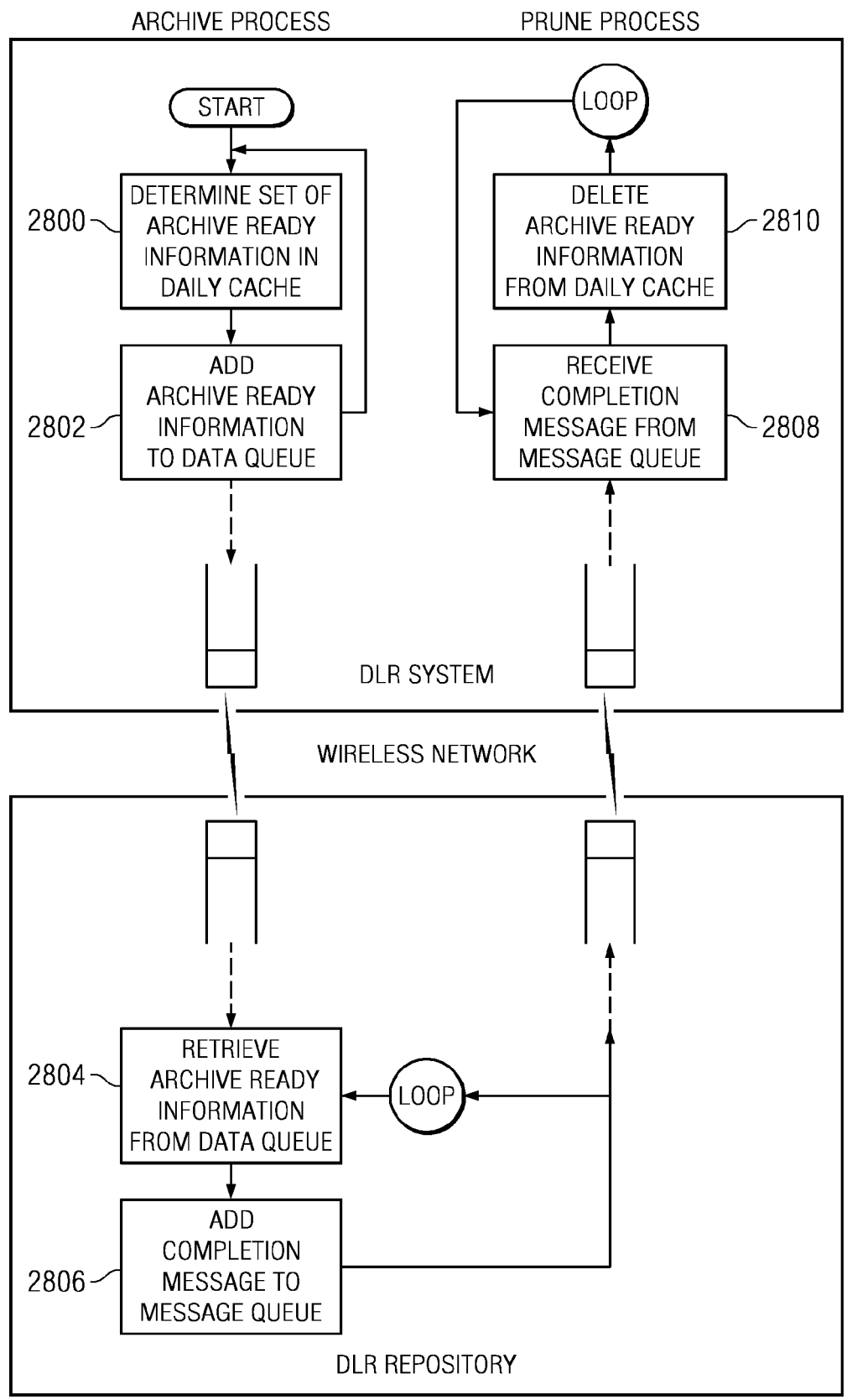
FIG. 28 is a flowchart of a process for archiving data objects in accordance with an illustrative embodiment.

FIG. 28 is a flowchart of a process for archiving data objects in accordance with an illustrative embodiment. The process illustrated in FIG. 28 may be implemented in a digital life recording system, such as digital life recorder 300 shown in FIG. 3.

The process begins by determining a set of archive ready information stored in the daily cache of a mobile device (DLR system) (step 2800). The mobile device is associated with a person being recorded. The archive ready information comprises of the stored data objects, metadata, and other data associated with the captured data. The process adds the set of archive ready information to a data queue (step 2802). The process loops and repeats the steps of determining (step 2800) and adding (step 2802) archive ready information to a data queue until there is no more archive ready information.

In response to the mobile device interfacing with a repository mass store, the process retrieves the set of archive ready information from the data queue (step 2804). The process inserts the set of archive ready information into the repository mass store, such as repository database 808 shown in FIG. 8. The process then adds a completion message to a message queue (step 2806). The process loops and repeats the steps of retrieving (step 2804) and inserting (step 2806) archive ready information into the repository mass store until all archive ready information is stored in the repository mass store.

The process receives completion messages from the message queue (step 2808). In response to receiving the completion messages from the message queue, the process deletes the set of archive ready information from the daily cache (step 2810). The process loops and repeats the steps of receiving completion messages from the message queue (step 2808) and deleting the set of archive ready information from the daily cache (step 2810).

Figure 29:
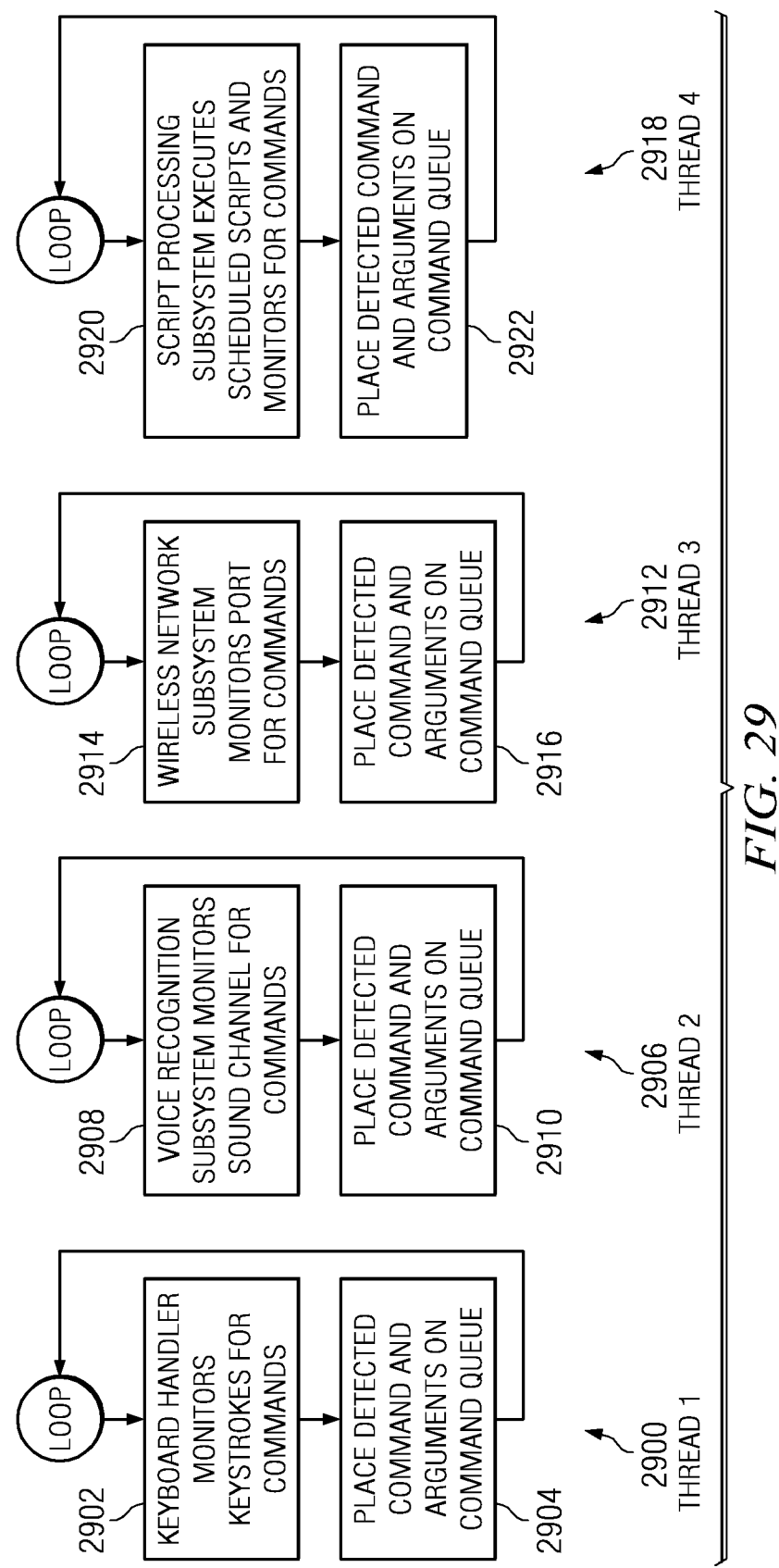
FIG. 29 illustrates different processes for adding commands to a command queue in accordance with an illustrative embodiment.

FIG. 29 is illustrates different processes for adding commands to a command queue in accordance with an illustrative embodiment. The processes illustrated in FIG. 29 may be implemented in a digital life recording system, such as digital life recorder 300 shown in FIG. 3.

In process 2900, a keyboard handler monitors keystrokes for commands (step 2902). In response to detecting a command, the detected command along with the associated arguments is placed on the command queue (step 2904). Process 2900 loops and continues monitoring (step 2902) and adding detected commands (step 2904) to the command queue.

In process 2906, a voice recognition subsystem monitors the sound channels for commands (step 2908). In response to detecting a command, the detected command along with the associated arguments is placed on the command queue (step 2910). Process 2906 loops and continues monitoring (step 2908) and adding detected commands (step 2910) to the command queue.

In process 2912, a wireless network subsystem monitors the ports for commands (step 2914). In response to detecting a command, the detected command along with the associated arguments is placed on the command queue (step 2916). Process 2912 loops and continues monitoring (step 2914) and adding detected commands (step 2916) to the command queue.

In process 2918, a script processing subsystem executes scheduled scripts and monitors for commands (step 2920). In response to detecting a command, the detected command along with the associated arguments is placed on the command queue (step 2922). Process 2918 loops and continues monitoring (step 2920) and adding detected commands (step 2922) to the command queue.

Figure 30:
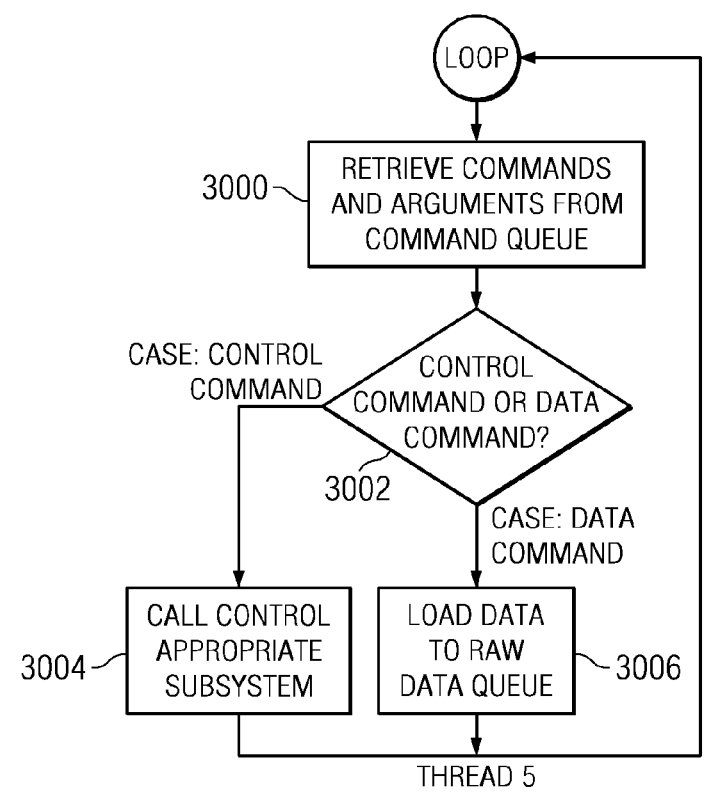
FIG. 30 is a flowchart of a process for processing commands in accordance with an illustrative embodiment.

With reference to FIG. 30, a flowchart a process for processing commands is depicted in accordance with an illustrative embodiment. The process illustrated in FIG. 30 may be implemented in a digital life recording system, such as digital life recorder 300 shown in FIG. 3.

The process begins by retrieving commands and their associated arguments from a command queue (step 3000), such as command queue 512 shown in FIG. 5. The process interprets the retrieved command to determine if the retrieved command is a control command or a data command (step 3002). A control command is a command that modifies the operation of the digital life recording system. A data command is command request to select data associated with the digital life recording system.

In response to determining that the retrieved command is a control command, the process calls the control appropriate subsystem for processing the command (step 3004). In response to determining that the retrieved command is a data command, the process loads selected data to the raw data queue (step 3006). The process loops and repeats steps 3000-3006 for all commands in the command queue.

Figure 31:
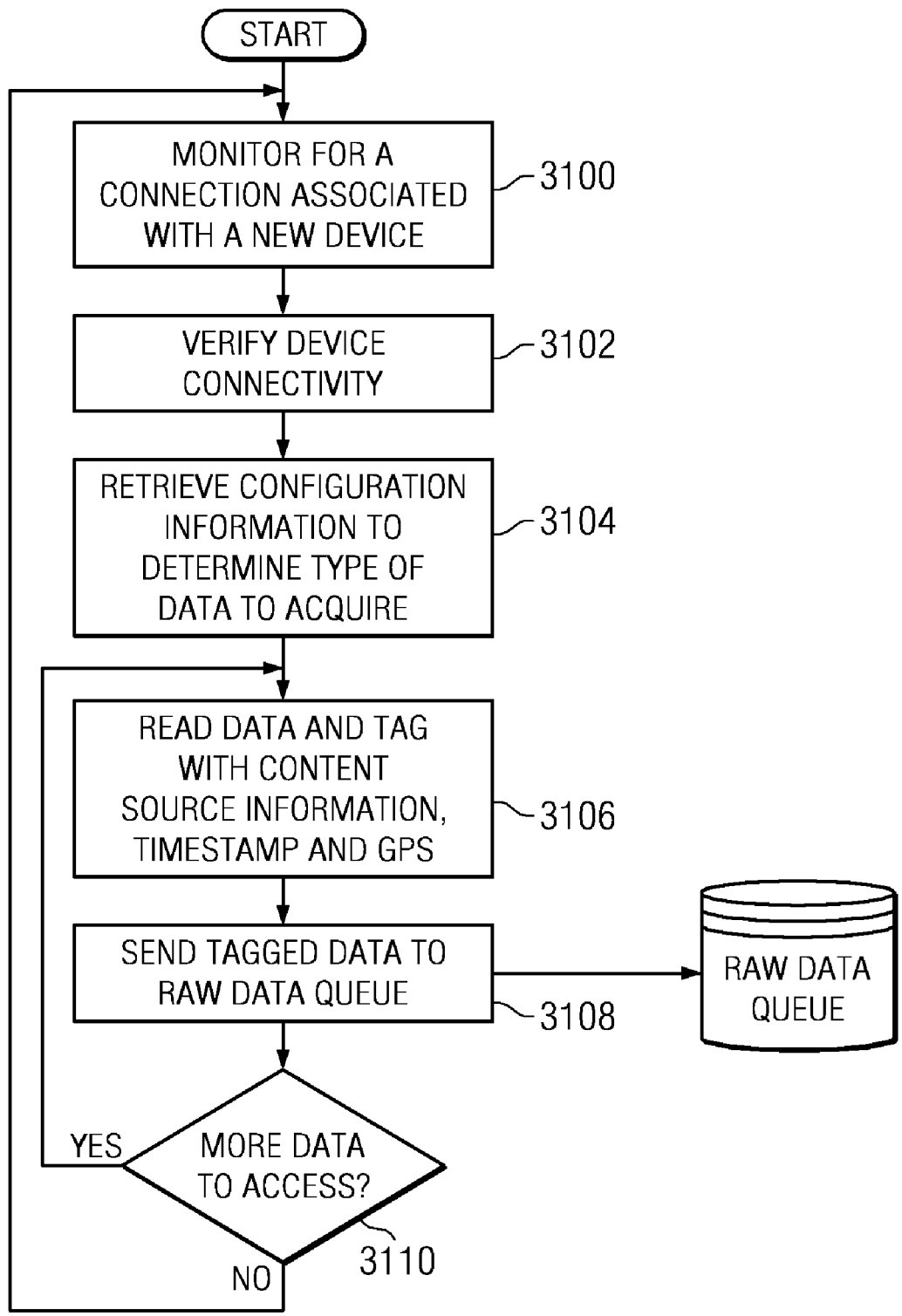
FIG. 31 is a flowchart of a process for acquiring and organizing personal device data in accordance with an illustrative embodiment.

With reference to FIG. 31, a flowchart illustrating a process for acquiring and organizing personal device data is depicted in accordance with an illustrative embodiment. The process illustrated in FIG. 31 may be implemented in a digital life recording system, such as digital life recorder 300 shown in FIG. 3.

The process begins by monitoring for a connection associated with a new device (step 3100). The connection may be established either wirelessly, such as, but not limited to, Bluetooth enabled devices, or the connection may be established through a physical connection, such as, but not limited to, universal serial bus (USB) devices. The devices may include, but are not limited to, cellular phones, personal digital assistants (PDAs), and digital cameras. Responsive to detecting a connection, the process verifies the device connectivity (step 3102).

The process retrieves configuration information to determine the type of data to acquire from the connected device (step 3104). The process then reads data from the connected device(s) and tags the data with the content source information, a timestamp and global positioning system location (step 3106). The process sends the tagged data to the raw data queue (step 3106). The process determines whether more data exists in the connected device (step 3110). In response to a determination that more data exists in the connected device, the process repeats the steps of reading and tagging the data (step 3106), and sending the tagged data to the raw data queue (step 3108). In response to a determination that more data does not exist in the connected device, the process returns to the step of monitoring for a connection associated with a new device (step 3100).

Figure 32:
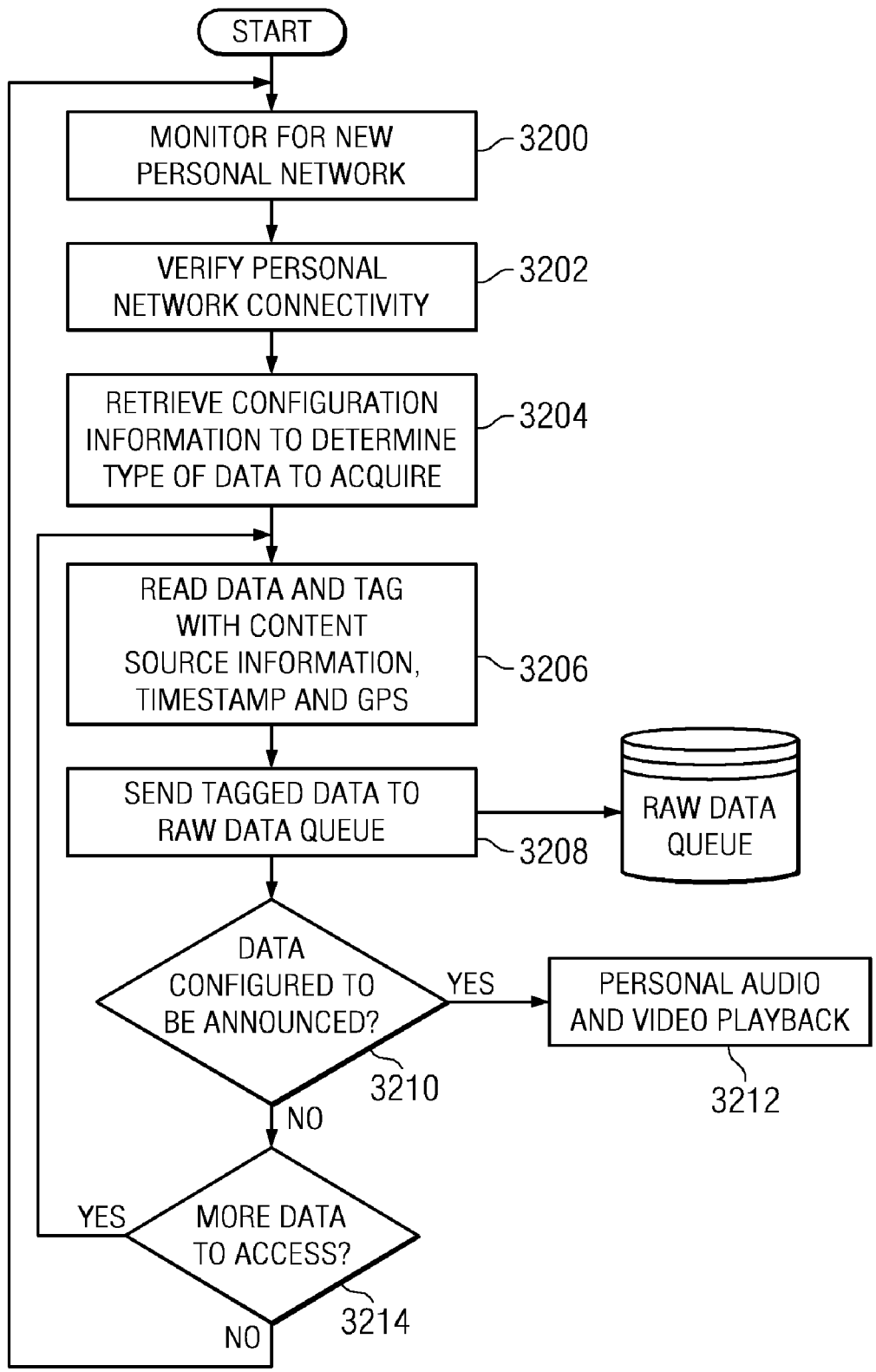
FIG. 32 is a flowchart of a process for acquiring and organizing personal network data in accordance with an illustrative embodiment.

FIG. 32 is a flowchart of a process for acquiring and organizing personal network data in accordance with an illustrative embodiment. The process illustrated in FIG. 32 may be implemented in a digital life recording system, such as digital life recorder 300 shown in FIG. 3.

The process begins by monitoring for a connection associated with a new personal network (step 3200). The connection may be established either by wired or wireless means. In response to detecting a connection, the process verifies the personal network connectivity (step 3202). The process retrieves configuration information to determine the type of data to acquire from the connected personal network (step 3204).

The process then reads data from the connected personal network and tags the data with the content source information, a timestamp and global positioning system location (step 3206). The process sends the tagged data to the raw data queue (step 3208).

The process determines whether the data is configured to be announced (step 3210). Responsive to a determination that the data is configured to be announced, the data is forwarded to a personal audio and video playback subsystem for announcing the data to the person (step 3212). The process determines whether more data exists in the connected personal network (step 3214).

In response to a determination that more data exists in the connected personal network, the process repeats the steps of reading and tagging the data (step 3206), sending the tagged data to the raw data queue (step 3208), and determining whether the data is configured to be announced (step 3210). In response to a determination that more data does not exist in the connected personal network, the process returns to the step of monitoring for a connection associated with a new personal network (step 3200).

Figure 33:
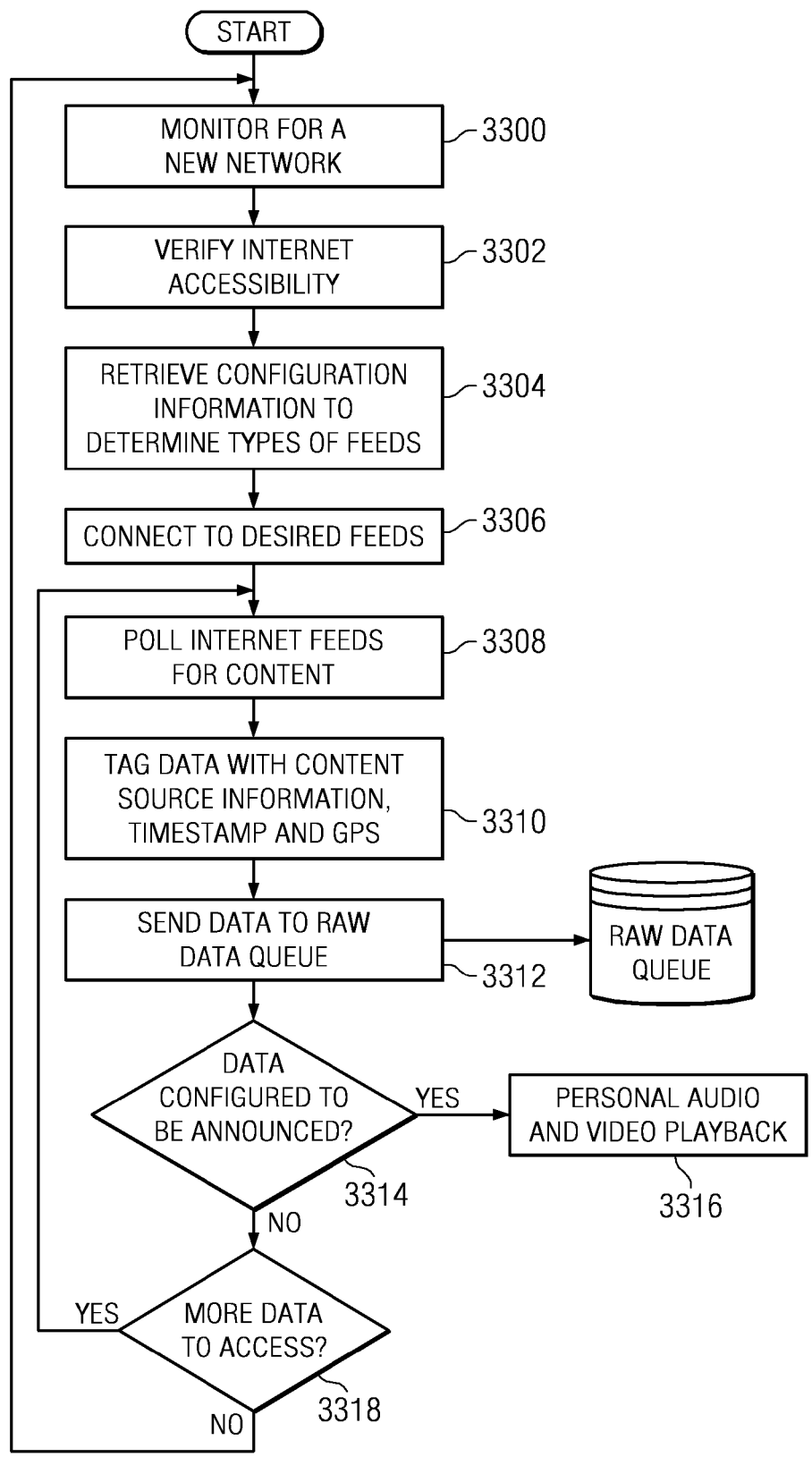
FIG. 33 is a flowchart of a process for acquiring and organizing data from the internet in accordance with an illustrative embodiment.

FIG. 33 is a flowchart of a process for acquiring and organizing data from the Internet in accordance with an illustrative embodiment. The process illustrated in FIG. 33 may be implemented in a digital life recording system, such as digital life recorder 300 shown in FIG. 3.

The process begins by monitoring for a connection associated with a new network (step 3300). The connection may be established either by wired or wireless means. In response to detecting a connection, the process verifies internet accessibility (step 3302). The process then retrieves configuration information to determine the types of feeds to acquire (step 3304). A feed is data created by a party and broadcast over the internet to others. The process connects to the desired feeds (step 3306) and polls the internet feeds for content (step 3308). In response to receiving data/content from the internet feeds, the data is tagged with the content source information, a timestamp, and global positioning system location (step 3310). The process sends the tagged data to the raw data queue (step 3312).

The process determines whether the data is configured to be announced (step 3314). Responsive to a determination that the data is configured to be announced, the data is forwarded to a personal audio and video playback subsystem for announcing the data to the person (step 3316). The process determines whether more data exists in the connected internet feeds (step 3312).

In response to a determination that more data exist in the connected internet feeds, the process repeats the steps of polling (step 3308) and tagging the data (step 3010), sending the tagged data to the raw data queue (step 3312), and determining whether the data is configured to be announced (step 3314). In response to a determination that more data does not exist in the connected internet feeds, the process returns to the step of monitoring for a connection associated with a new network (step 3300).

Figure 34:
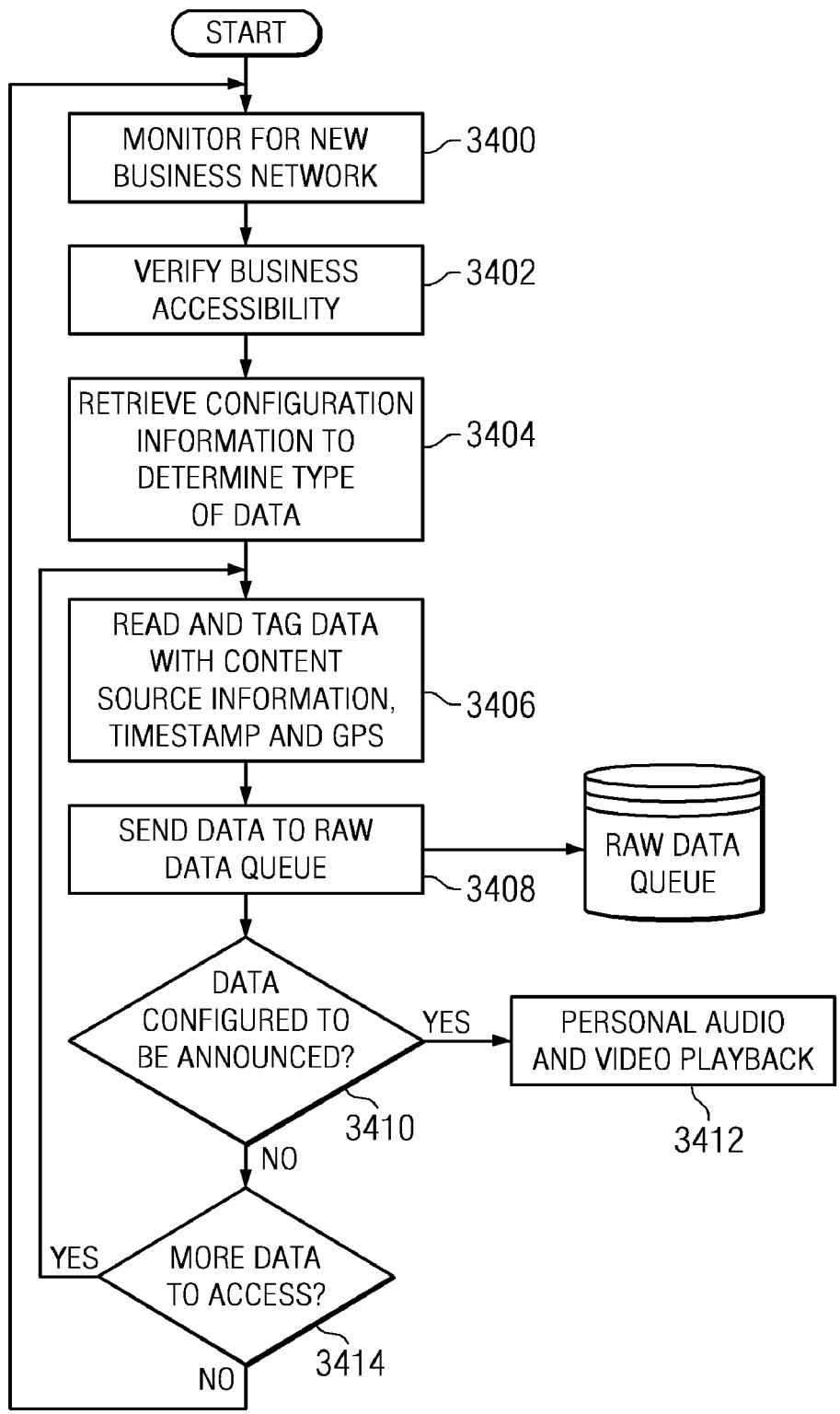
FIG. 34 is a flowchart of a process for acquiring and organizing data from business networks in accordance with an illustrative embodiment.

FIG. 34 is a flowchart of a process for acquiring and organizing data from business networks in accordance with an illustrative embodiment. The process illustrated in FIG. 34 may be implemented in a digital life recording system, such as digital life recorder 300 shown in FIG. 3.

The process begins by monitoring for a connection associated with a new business network (step 3400). The connection may be established either by wired or wireless means. In response to detecting a connection, the process verifies the business network connectivity (step 3402). The process retrieves configuration information to determine the type of data to acquire from the connected business network (step 3404). The process then reads data from the connected business network and tags the data with the content source information, a timestamp, and global positioning system location (step 3406). The process sends the tagged data to the raw data queue (step 3408).

The process determines whether the data is configured to be announced (step 3410). Responsive to a determination that the data is configured to be announced, the data is forwarded to a personal audio and video playback subsystem for announcing the data to the person (step 3412). The process determines whether more data exist in the connected business network (step 3414).

In response to a determination that more data exists in the connected business network, the process repeats the steps of reading and tagging the data (step 3406), sending the tagged data to the raw data queue (step 3408), and determining whether the data is configured to be announced (step 3410). In response to a determination that more data does not exist in the connected business network, the process returns to the step of monitoring for a connection associated with a new business network (step 3400).

Figure 35:
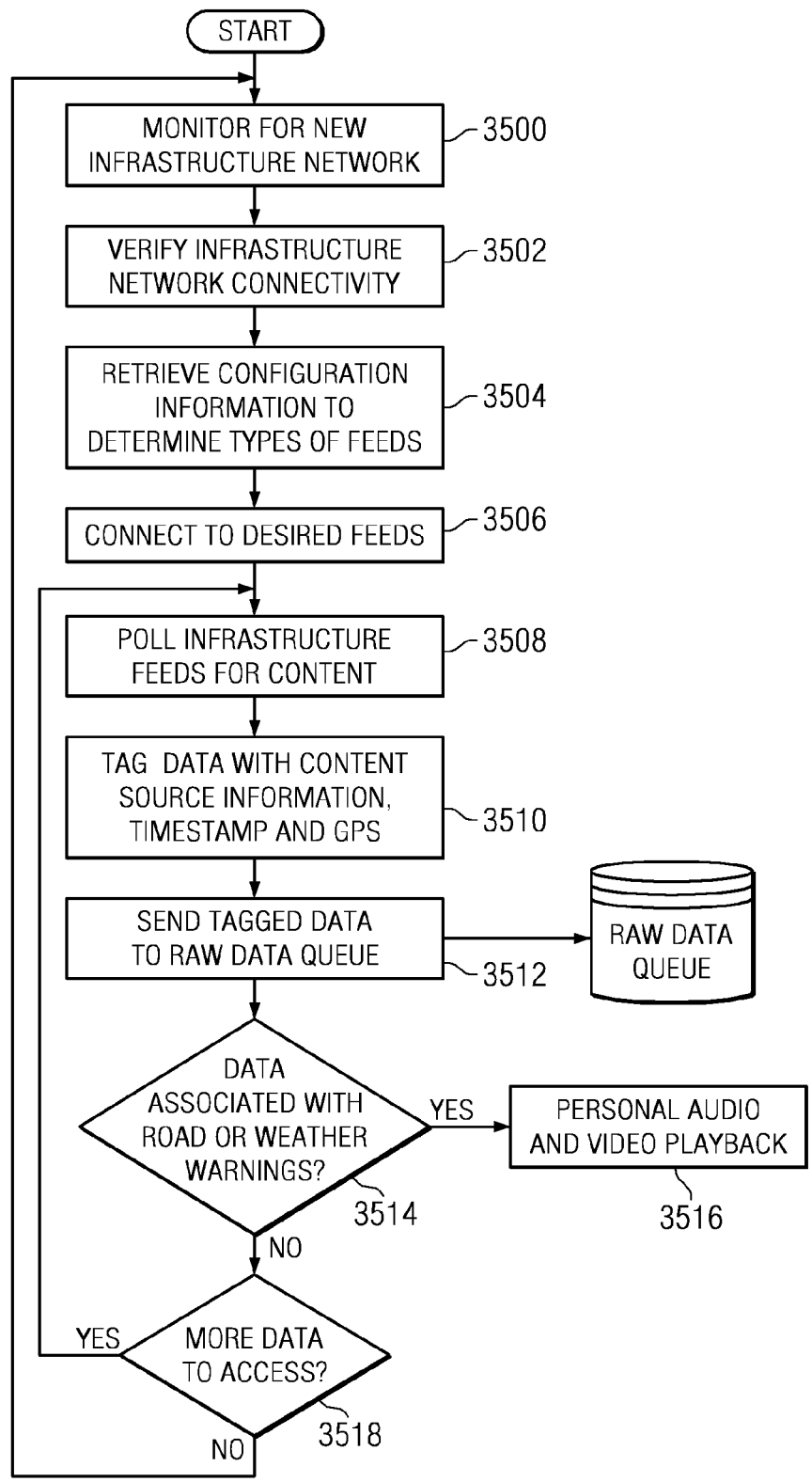
FIG. 35 is a flowchart of a process for acquiring and organizing data from infrastructure networks in accordance with an illustrative embodiment.

FIG. 35 is a flowchart of a process for acquiring and organizing data from infrastructure networks in accordance with an illustrative embodiment. The process illustrated in FIG. 35 may be implemented in a digital life recording system, such as digital life recorder 300 shown in FIG. 3.

The process begins by monitoring for a connection associated with a new infrastructure network (step 3500). The connection may be established either by wired or wireless means. In response to detecting a connection, the process verifies infrastructure network connectivity (step 3502). The process then retrieves configuration information to determine the types of feeds to acquire (step 3504). The types of feeds may include, but are not limited to, feeds containing data associated with weather conditions and feeds containing data associated with road conditions.

The process connects to the desired feeds (step 3506) and polls the infrastructure feeds for content (step 3508). In response to receiving data/content from the infrastructure feeds, the data is tagged with the content source information, a timestamp and global positioning system location (step 3510). The process sends the tagged data to the raw data queue (step 3512).

The process determines whether the retrieved data contains data associated with road warnings or weather warnings related to the current location of the person (step 3514). In response to a determination that the retrieved data contains data associated with road warnings or weather warnings related to the current location of the person, the road warning/weather warning is sent to a personal audio and video playback subsystem for announcing the warning(s) to the person (step 3516).

The process determines whether more data exists in the connected infrastructure feeds (step 3518). In response to a determination that more data exists in the connected infrastructure feeds, the process repeats the steps of polling (step 3508) and tagging the data (step 3510), sending the tagged data to the raw data queue (step 3512), and determining whether the data contains data associated with road warnings or weather warnings related to the current location of the person (step 3514).

In response to a determination that more data does not exist in the connected infrastructure feeds, the process returns to the step of monitoring for a connection associated with a new infrastructure network (step 3500).

Figure 36:
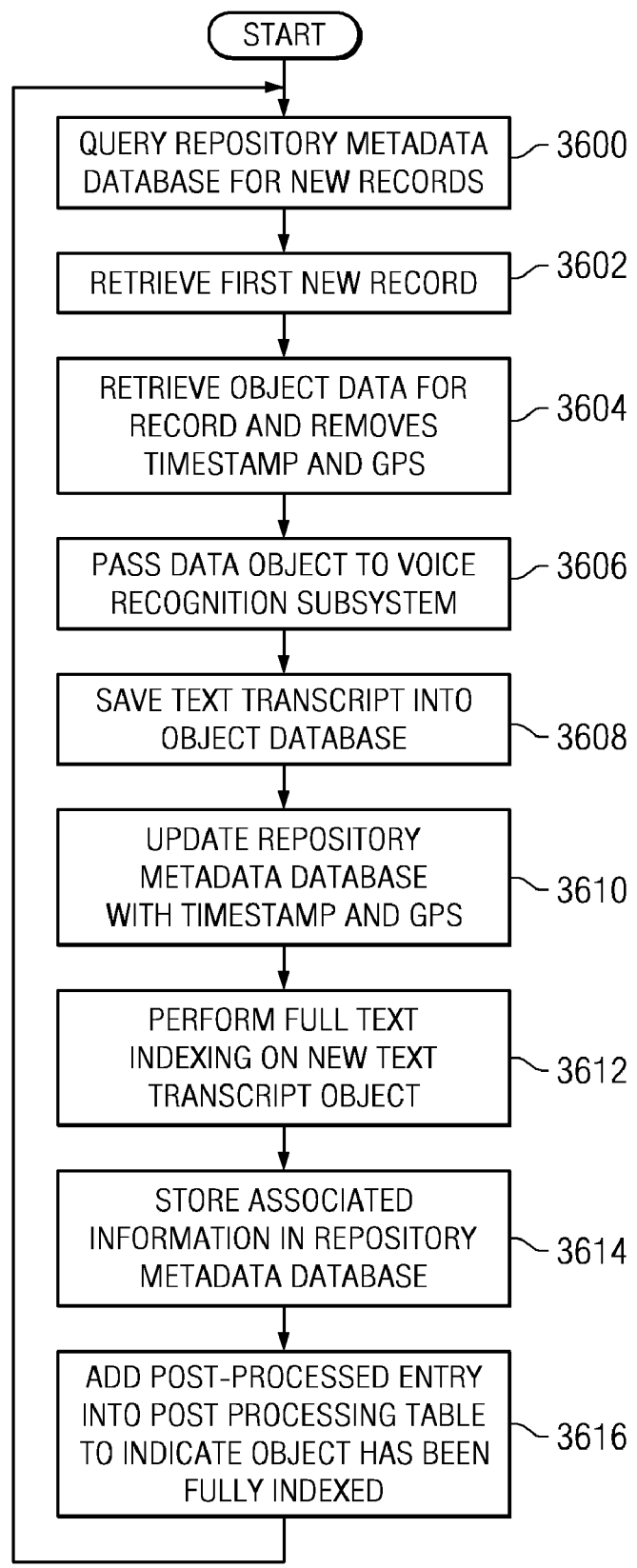
FIG. 36 is a flowchart of a process for indexing data stored in the repository mass store in accordance with an illustrative embodiment.

With reference now to FIG. 36, a flowchart of a process for improving the indexing of data stored in the repository mass store is depicted in accordance with an illustrative embodiment. The process illustrated in FIG. 36 may be implemented in a digital life recording system, such as digital life recorder 300 shown in FIG. 3.

The process begins by querying a repository metadata database, such as digital life metadata database 538 shown in FIG. 5, for new records (step 3600). In response to a determination that new records exist, the process retrieves the first new record (step 3602). The process retrieves the object data associated with the new record and retrieves the global positioning system (GPS) timestamp and location from the object data (step 3604). The process passes the data object to a voice recognition subsystem to generate a text transcript of the object data (step 3606).

The process saves the text transcript into an object database (step 3608), such as digital life information object database 540 shown in FIG. 5. The process then updates the repository metadata database with the global positioning system (GPS) timestamp and location, a unique identifier that points to the physical location of the text object (step 3610). The process then performs full text indexing on the new text transcript object (step 3612). The process stores the information associated with the full text indexing in the repository metadata database (step 3614). The process adds a post-processed entry, for the text transcript object, into a post processing table to indicate that the associated text transcript object has been fully indexed (step 3616). The process loops and queries the repository metadata database for a new record (step 3600).

Figure 37:
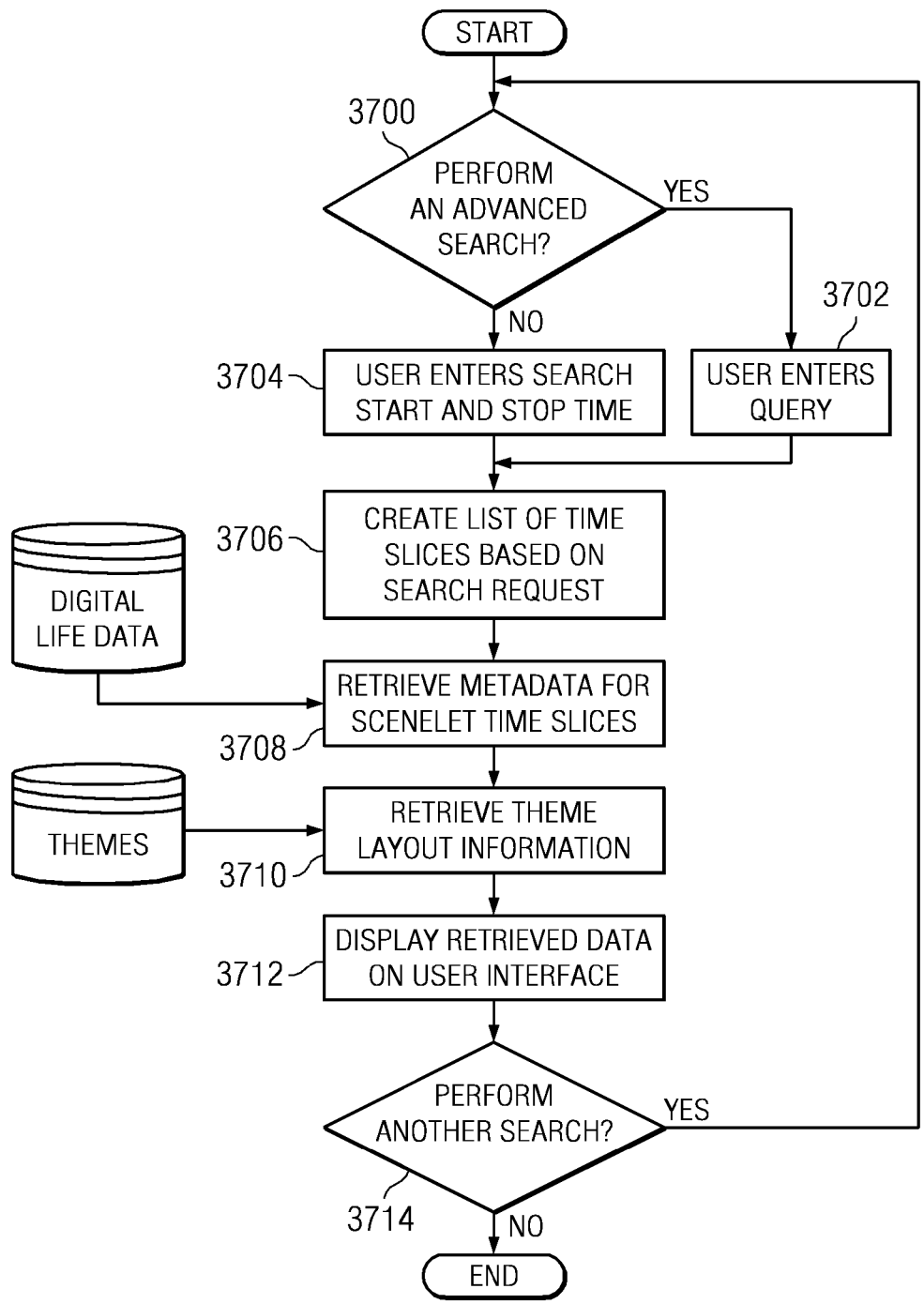
FIG. 37 is a flowchart of a process for searching, retrieving, and rendering data in accordance with an illustrative embodiment.

With reference now to FIG. 37, a flowchart of a process for searching, retrieving, and rendering data is depicted in accordance with an illustrative embodiment. The process illustrated in FIG. 37 may be implemented in a digital life recording system, such as digital life recorder 300 shown in FIG. 3.

The process begins by determining whether the user has selected an option to perform an advance search (step 3700). In an advance search, the process receives a query request from a user to query the repository database (step 3702). The query uses a database querying language, such as, but not limited to, structured query language (SQL). For a regular search, the process receives a request from a user containing a starting date/time and an ending date/time (step 3704). The process creates a list of time slices based on the search request (step 3706).

The process retrieves metadata for the scenelet time slices from a digital life data repository (step 3708), such as digital life data repository 1104 shown in FIG. 11. The process also retrieves metadata for non-video information, such as, but not limited to, audio and temperature. The process then retrieves theme layout information from a themes database (step 3710), such as themes database 1118 shown in FIG. 11. The process displays the retrieved data on a user interface (step 3712), such as user interface 1200 shown in FIG. 12. The process then determines whether another search request is to be performed (step 3714). In response to determining that another search request is to be performed, the process loops back to step 3700.

Figure 38:
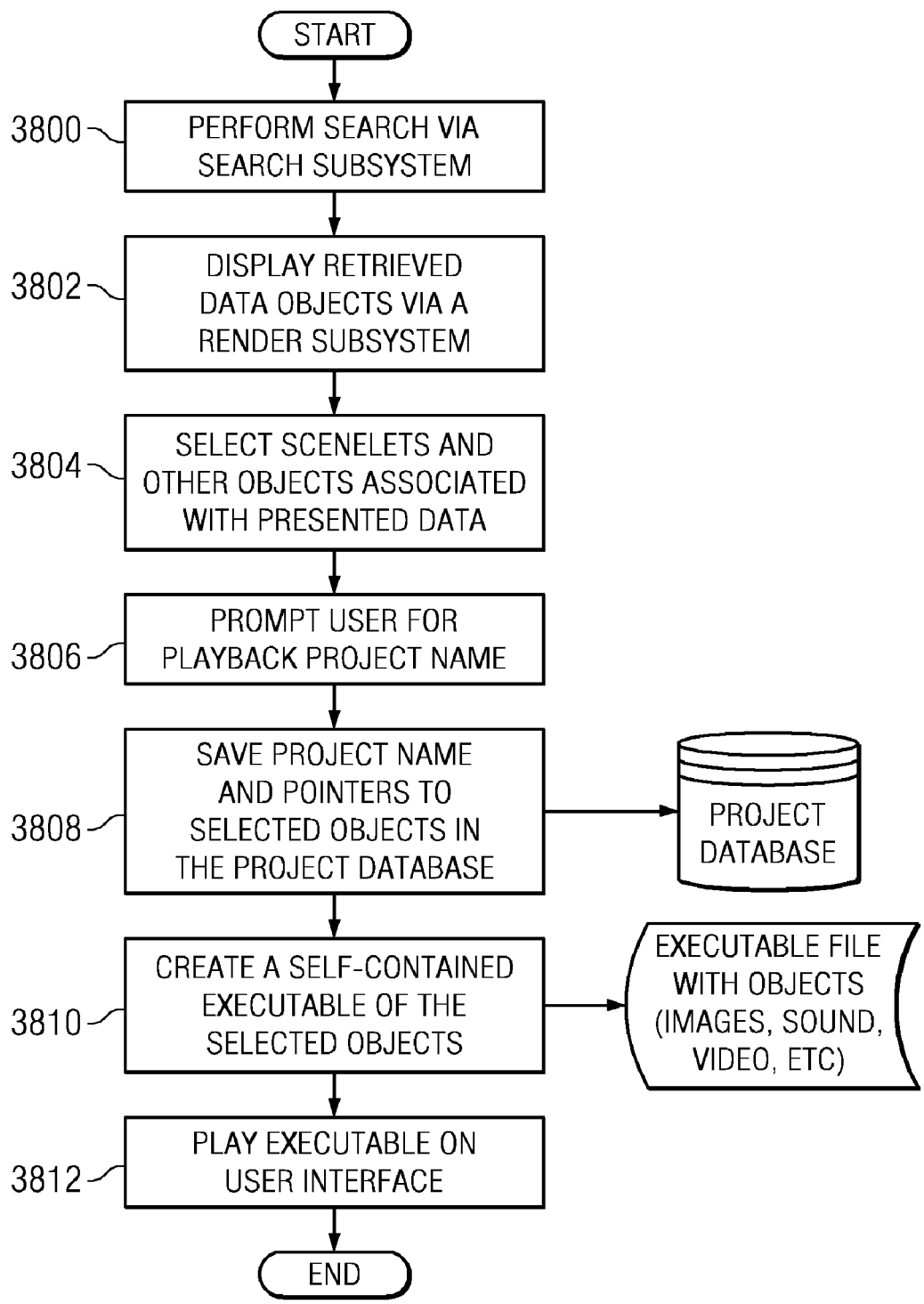
FIG. 38 is a flowchart of a process for organizing and presenting data in accordance with an illustrative embodiment.

With reference now to FIG. 38, a flowchart of a process for organizing and presenting data is depicted in accordance with an illustrative embodiment. The process illustrated in FIG. 38 may be implemented in a digital life recording system, such as digital life recorder 300 shown in FIG. 3.

The process begins by performing a search for data objects via a search subsystem (step 3800), such as search subsystem 1112 shown in FIG. 11. The process displays the retrieved data objects via a render subsystem (step 3802), such as render subsystem 1114 shown in FIG. 11. The process selects scenelets and other objects associated with presented data (step 3804).

The process then prompts a user for a playback project name (step 3806). In response to receiving a project name from a user, the process saves the project name and pointers to the selected objects in a project definitions database (step 3808), such as project definitions database 1158 shown in FIG. 11. A pointer is a variable that holds the address of a data object or function.

The process then creates a self-contained executable of the selected objects (step 3810). The self-contained executable may be emailed, posted to a web site, or saved in non-volatile memory, such as on a hard drive. In response to a receiving a request to execute the self-contained executable of the selected objects, the process plays the self-contained executable on a user interface (step 3812), such as user interface 1200 shown in FIG. 12.

The illustrative embodiments described herein provide a computer implemented method, apparatus, and computer program product for acquiring face glossary data for identifying subjects detected by a digital life recorder. In one embodiment, the process identifies a source of the face glossary data in response to detecting an acquisition condition, wherein the source comprises at least one of a raw data queue, a first glossary from a peer digital life recorder system, and a second glossary from a remote repository. The process retrieves the face glossary data from the source. Thereafter, the process stores the face glossary data from the source into a face glossary database in a face glossary repository. The face glossary repository may be communicatively coupled to a face glossary cache. In some embodiments, the face glossary cache may be externally coupled to the face glossary database. In some embodiments, the face glossary database may be internal to the face glossary database.

The illustrative embodiments show a system and method for acquiring face glossary data from the various sources described herein. The acquisition of face glossary data provides a user of the digital life recorder to have access to a growing database of face glossary data which enables the user to identify people encountered by the user. In addition, the newly acquired face glossary data increases the likelihood that the digital life recorder will be able to recognize subjects in digital images for subsequent processing and/or storage. In addition, a greater amount of face glossary data enables a digital life recorder to more accurately identify faces.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur in a different order or sequence other than those illustrated by the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product including a computer usable or computer readable medium storing program code for use by or in connection with a computer or any instruction execution system.

It is important to note that while the present invention has been described in the context of a fully functioning data processing system, those of ordinary skill in the art will appreciate that the processes of the present invention are capable of being distributed in the form of a computer readable medium embodying tangible instructions and a variety of forms and that the present invention applies equally regardless of the particular type of signal bearing media actually used to carry out the distribution.

Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for identifying an individual in an image, the computer implemented method comprising:

capturing audio data and video data by a digital life recorder comprising a plurality of cameras positioned on a user, a plurality of microphones positioned on the user, a set of headphones positioned on the user, and a display device, wherein the display device is a mobile device and wherein the video data includes a continuous stream of images;

extracting, from the continuous stream of images, data that includes a set of facial frames;

responsive to capturing the data that includes the set of facial frames, automatically identifying, by a processing unit of the digital life recorder, an individual face in the set of facial frames based on metadata associated with the set of facial frames to form an identification, wherein the metadata associated with the set of facial frames includes a first time a facial frame in the set of facial frames including the individual face was captured by a camera in the plurality of cameras;

indexing the individual face identified in a glossary based on the metadata associated with the set of facial frames;

responsive to identifying the individual face, displaying the individual face and the identification of the individual face on the display device of the digital life recorder and requesting confirmation of the identification of the individual face from the user;

extracting a set of voice commands spoken by the user from the audio data, wherein extracting the set of voice commands spoken by the user from the audio data comprises:

recognizing a voice as that of the user and filtering the set of voice commands from the audio data captured;

identifying a second time a first voice command in the set of voice commands was spoken by the user;

executing the first voice command to identify an individual face in the set of facial frames by matching the second time the first voice command was spoken by the user with the first time the facial frame in the set of facial frames was captured by the camera, wherein the first voice command includes an identification from the user of the individual face in the set of facial frames;

executing a second voice command in the set of voice commands to control the capturing of the audio data and the video data by the plurality of cameras and the plurality of microphones of the digital life recorder positioned on the user;

obtaining feedback from the user about the capturing of the audio data and the video data by the digital life recorder using the set of headphones; and using the feedback obtained to further control the capturing of the audio data and the video data by the digital life recorder.

2. The computer implemented method of claim 1, wherein automatically identifying the individual face in the set of facial frames comprises:

processing the set of facial frames to extract a set of single face images and metadata describing the set of single face images; and comparing each face image in the set of single face images to a facial image data broadcast from an external recording subsystem.

3. The computer implemented method of claim 2 further comprising:

responsive to comparing each face image in the set of single face images to a facial image data broadcast from an external recording subsystem, determining an existence of a match;

responsive to the existence of the match, determining if an immediate identification is required;

responsive to an immediate identification being required, transmitting identification information to a monitor; and responsive to an immediate identification not being required, transmitting identification information to a data processed queue.

4. The computer implemented method of claim 3 further comprising:

responsive to determining that a match does not exist, comparing the set of facial frames that have been processed to metadata in the glossary.

5. The computer implemented method of claim 1 further comprising:

responsive to the processing unit of the digital life recorder being unable to identify the individual face in the set of facial frames, displaying the individual face on the display device of the digital life recorder and requesting an identification of the individual face through the display device.

6. The computer implemented method of claim 1 further comprising:

detecting a connectivity of an external recording subsystem;

determining if identification information exists in the external recording subsystem; and responsive to an existence of identification information, receiving facial and metadata information from the external recording subsystem.

7. A computer program product comprising:

a computer readable storage medium tangibly embodying executable program instructions configured to identify an individual in an image;

first program instructions configured to capture audio data and video data by a digital life recorder comprising a plurality of cameras positioned on a user, a plurality of microphones positioned on the user, a set of headphones positioned on the user, and a display device, wherein the display device is a mobile device and wherein the video data includes a continuous stream of images;

second program instructions configured to extract from the continuous stream of images, data that includes a set of facial frames;

third program instructions configured to automatically identify, responsive to capturing the data that includes the set of facial frames, an individual face in the set of facial frames based on metadata associated with the set of facial frames to form an identification, wherein the metadata associated with the set of facial frames includes a first time a facial frame in the set of facial frames including the individual face was captured by a camera in the plurality of cameras;

fourth program instructions configured to index the individual face in a glossary based on the metadata associated with the set of facial frames;

fifth program instructions configured to display, responsive to identifying the individual face, the individual face and the identification of the individual face on the display device of the digital life recorder and request confirmation of the identification of the individual face from the user;

sixth program instructions configured to extract a set of voice commands spoken by the user from the audio data, wherein the sixth program instructions comprise:
program instructions configured to recognize a voice as that of the user and filtering the set of voice commands from the audio data captured;

seventh program instructions configured to identify a second time a first voice command in the set of voice commands was spoken by the user;

eighth program instructions configured to execute the first voice command to identify an individual face in the set of facial frames by matching the second time the first voice command was spoken by the user with the first time the facial frame in the set of facial frames was captured by the camera, wherein the first voice command includes an identification from the user of the individual face in the set of facial frames;

ninth program instructions configured to execute a second voice command in the set of voice commands to control the capture of the audio data and the video data by the plurality of cameras and the plurality of microphones of the digital life recorder positioned on the user;

tenth program instructions configured to obtain feedback from the user about the capturing of the audio data and the video data by the digital life recorder using the set of headphones; and eleventh program instructions configured to use the feedback obtained to further control the capturing of the audio data and the video data by the digital life recorder, wherein the first through eleventh program instructions are stored on the computer readable storage medium.

8. The computer program product of claim 7, wherein the third program instructions comprise:
program instructions configured to process the set of facial frames to extract a set of single face images and metadata describing the set of single face images; and
program instructions configured to compare each face image in the set of single face images to a facial image data broadcast from an external recording subsystem.

9. The computer program product of claim 8 further comprising:
twelfth program instructions configured to determine, responsive to comparing each face image in the set of single face images to a facial image data broadcast from an external recording subsystem, an existence of a match;

thirteenth program instructions configured to determine, responsive to the existence of the match, if an immediate identification is required;

fourteenth program instructions that, responsive to an immediate identification being required, transmit identification information to a monitor; and fifteenth program instructions configured to transmit, responsive to an immediate identification not being required, identification information to a data processed queue, wherein the twelfth through fifteenth program instructions are stored on the computer readable storage medium.

10. The computer program product of claim 9 further comprising:
sixteenth program instructions configured to compare, responsive to determining that a match does not exist, the set of facial frames that have been processed to metadata in the glossary, wherein the sixteenth program instructions are stored on the computer readable storage medium.

11. The computer program product of claim 7 further comprising:
seventeenth program instructions configured to compare, responsive to being unable to identify the individual face in the set of facial frames, the individual face on the display device of the digital life recorder and request an identification of the individual face through the display device, wherein the seventeenth program instructions are stored on the computer readable storage medium.

12. An apparatus comprising:
a bus system;
a memory connected to the bus system, wherein the memory includes a computer usable program code; and
a processing unit connected to the bus system, wherein the processing unit is configured to execute the computer usable program code to:
capture audio data and video data by a digital life recorder comprising a plurality of cameras positioned on a user, a plurality of microphones positioned on the user, a set of headphones positioned on the user, and a display device, wherein the display device is a mobile device and wherein the video data includes a continuous stream of images;
extract, from the continuous stream of images, data that includes a set of facial frames;
responsive to capturing the data that includes the set of facial frames, automatically identify an individual face in the set of facial frames based on metadata associated with the set of facial frames to form an identification, wherein the metadata associated with the set of facial frames includes a first time a facial frame in the set of facial frames including the individual face was captured by a camera in the plurality of cameras;
index the individual face in a glossary based on the metadata associated with the set of facial frames;
responsive to identifying the individual face, display the individual face and the identification of the individual face on the display device of the digital life recorder and request confirmation of the identification of the individual face from the user;
extract a set of voice commands spoken by the user from the audio data, wherein in executing the computer usable program code to extract the set of voice commands spoken by the user from the audio data the processing unit is further configured to execute the computer usable program code to:

recognize a voice as that of the user and filtering the set of voice commands from the audio data captured;

identify a second time a first voice command in the set of voice commands was spoken by the user;

execute the first voice command to identify an individual face in the set of facial frames by matching the second time the first voice command was spoken by the user with the first time the facial frame in the set of facial frames was captured by the camera, wherein the first voice command includes an identification from the user of the individual face in the set of facial frames;

execute a second voice command in the set of voice commands to control the capture of the audio data and the video data by the plurality of cameras and the plurality of microphones of the digital life recorder positioned on the user;

obtain feedback from the user about the capturing of the audio data and the video data by the digital life recorder using the set of headphones; and use the feedback obtained to further control the capturing of the audio data and the video data by the digital life recorder.

13. The apparatus of claim 12, wherein in executing the computer usable program code to automatically identify the individual face in the set of facial frames, the processing unit is further configured to execute the computer usable program code to:

process the set of facial frames to extract a set of single face images and metadata describing the set of single face images; and compare each face image in the set of single face images to facial image data broadcast from an external recording subsystem.

14. The apparatus of claim 13, wherein the processing unit is further configured to execute the computer usable program code to:

responsive to comparing each face image in the set of single face images to a facial image data broadcast from an external recording subsystem, determine an existence of a match;

responsive to the existence of the match, determining if an immediate identification is required;

responsive to an immediate identification being required, transmitting identification information to a monitor; and responsive to an immediate identification not being required, transmitting identification information to a data processed queue.

15. The apparatus of claim 14, wherein the processing unit is further configured to execute the computer usable program code to:

responsive to determining that a match does not exist, compare the set of facial frames that have been processed to metadata in the glossary.

16. The apparatus of claim 13, wherein the processing unit is further configured to execute the computer usable program code to:

detect a connectivity of an external recording subsystem;

determine if identification information exists in the external recording subsystem; and responsive to an existence of identification information, receive facial and metadata information from the external recording subsystem.

17. The computer implemented method of claim 1, wherein the identification from the user of the individual face in the set of facial frames includes a name of a person pictured in the set of facial frames.

* * * * *